United States Patent [19]
Christmas

[11] Patent Number: 6,085,084
[45] Date of Patent: Jul. 4, 2000

[54] AUTOMATED CREATION OF A LIST OF DISALLOWED NETWORK POINTS FOR USE IN CONNECTION BLOCKING

[76] Inventor: Christian Christmas, P.O. Box 621, Graton, Calif. 95444

[21] Appl. No.: 08/936,273

[22] Filed: Sep. 24, 1997

[51] Int. Cl.$^7$ ...................................................... H04B 7/26
[52] U.S. Cl. ........................................... 455/411; 455/426
[58] Field of Search .................................... 455/410, 411, 455/418, 422, 423, 424, 426, 432, 433, 435, 450; 370/327, 328, 339, 330, 341; 380/23

[56] References Cited

U.S. PATENT DOCUMENTS

| | | | |
|---|---|---|---|
| 5,541,977 | 7/1996 | Hodges et al. ........................... | 455/411 |
| 5,596,641 | 1/1997 | Ohashi et al. .............................. | 380/23 |
| 5,826,186 | 10/1998 | Mitchell et al. .......................... | 455/410 |

*Primary Examiner*—Thanh Cong Le

[57] ABSTRACT

An automated network access protection system providing an efficient method for creating a list of disallowed network connection points. This is done by collecting network addresses connected to by users who have accessed the network in an unauthorized manner. This list of addresses is filtered to eliminate addresses which have been connected to by users not known to be unauthorized. Once this filtering has been completed, the list contains network addresses or phone numbers connected to only by unauthorized users. This list may further be filtered by removing any network addresses which appear in a separate list of globally valid addresses. This list may also be filtered to eliminate network addresses which are owned by commercial entities. Finally, custom filters may be applied to this list. After this filtering, this list is transferred to a mechanism for preventing connection to or from any of the network addresses or phone numbers contained in the disallowed list. The disallowed list may also be used to identify unauthorized network access attempts. By recognizing that a user is attempting to connect to or from a network address or phone number contained in the disallowed list, the network operator can reasonably presume that the attempt was unauthorized.

1 Claim, 10 Drawing Sheets

| Abbreviation | Definition | Figures |
|---|---|---|
| CDR | Connection Detail Record | 5,6,7,7b,8 |
| DCP | Destination Connection Point | 5,6,7,8,9 |
| PDL | Pending Disallowed Destinations List | 5 |
| TIDL | Tagged ID List | 5,6,9 |
| X | Variable - Represents a quantity of time | 5,6,7,7a,8 |
| NTDL | Non-Tagged IDs' Destination List | 6,7,7a,7b,9 |
| EA | Variable - Date/Time of Earliest Attempt to connect to a DCP | 6,7,7a,7b |
| LA | Variable - Latest (most recent) Attempt to connect to a DCP | 6,7,7a,7b |
| ADL | Active Disallowed Destinations List | 6,8 |
| MRA | Variable - Date/time of Most Recent Attempt to connect to a DCP | 6,8 |
| DTN | Variable - Date/time Now (current date/time) | 6,8 |
| ADCPRL | Archived Destination Points Restore List | 9 |

Table A - Abbreviations used in flow charts of FIG. 5, FIG. 6, FIG. 7a, FIG. 7b, FIG. 8 and FIG. 9.

FIG. 10

AUTOMATED CREATION OF A LIST OF DISALLOWED NETWORK POINTS FOR USE IN CONNECTION BLOCKING

TECHNICAL FIELD

This invention relates generally to preventing unauthorized access to voice or data network systems. More particularly the invention relates to a method and article for automated creation of a list of network points known to be connected to only by unauthorized system users, or from which connection only to unauthorized users have occurred, and use of that list to prevent unauthorized access to the network.

BACKGROUND OF THE INVENTION

The disclosure of this invention will focus on its application in the AMPS cellular telephone system. This is done for the sake of clarity and brevity, since describing this invention as it applies to each of the other voice and data network system protocols would be needlessly tedious. It will become clear to a person reasonably skilled in this art that the methods described in this disclosure can be applied similarly to any wireline or wireless voice or data network system. While the cellular network uses digits dialed by telephones for determining which points in the network will be connected, it is easy to replace dialed digits with other data or voice network connection addressing schemes, thereby allowing application of this invention to those types of networks. In any network where unauthorized access to the network requires the unauthorized user to present a connection point address, description or dialed digits, this invention will take advantage of that aspect of the network connection protocol.

An important aspect of the activities of network users is that most will only attempt to connect (or be connected to from) a limited quantity of destinations in a relatively repetitive pattern. This means that, for an average network user, a specific list of unique destination connection points can be established which account for the majority of the network time used during connections established by that user. Fortunately, this also applies to unauthorized users of network systems.

Currently there is extensive fraudulent access to the cellular network using a stolen mobile phone number (MIN) combined with its mated electronic serial numbers (ESN). These stolen MIN/ESN pairs (IDs) are programmed into the phones of unauthorized system users. Once a stolen ID has been programmed into an unauthorized cellular telephone, the cellular switch can not distinguish this phone from the original, since a look-up of its ID for validation purposes will of course be successful.

IDs are obtained by unauthorized users through various methods such as decoding the data from signals received when a valid mobile unit attempts to connect a call, or by stealing them through illegal access to the cellular carrier's data base or by having a cellular employee steal the IDs. These stolen IDs are used by unauthorized users locally, as well as being traded for others throughout the country.

In current art, to prevent unauthorized system access, cellular telephone carriers use various well known pre-call and post-call validation mechanisms for call attempts made on their systems. Current validation schemes include technologies such as remote pre-call lookup of the phone's ID in the home switch (for roaming units), post-call "profiling" of customer usage, pre-call radio frequency (RF) "fingerprint" comparison of call attempts to stored RF fingerprints of valid mobile phones, pre-call authentication key exchange, pre-call voice verification, and pre-call entry of personal identification numbers. While each of these technologies provides a level of protection for the wireless network, significant quantities of unauthorized users continue to successfully complete calls through the network. This is due in large part to the limited deployment and specific effectiveness of the various technologies currently available. Since most of these technologies are time consuming, expensive and complex to implement, many cellular markets currently operate without the fraud protection these technologies provide.

Pre-call validation mechanisms have historically been the most effective approach for preventing fraudulent calls before they are connected. This has the distinct advantage of both preventing the losses which the call would have incurred and preventing the appearance of the call on the valid customer's bill. Pre-call blocking decisions are currently made based on the validity of the MIN/ESN pair, the RF fingerprint of the phone, the knowledge or suspicion that the ID has been stolen, the location of the mobile, the validity of a personal identification number, the voice of the phone user, the validity of an authentication key exchange, or the dialed digits of the call. On a call-by-call basis, one or more of these parameters are checked to verify whether the cellular phone or user is a valid one. If the phone or user is considered unauthorized based on any of these parameters, the call is prevented from completing.

As can be seen with the current ID "cloning" in the cellular markets, the MIN/ESN check has very little value in the pre-call prevention of fraudulent access to the network. Cloned phones will always validate in a MIN/ESN check since the valid unit's ID has been programmed into the unauthorized phone.

RF fingerprinting has been able to stop call attempts made by phones identified as invalid, but the identification can be in error and the protection is limited to geographic areas covered by RF fingerprinting receivers. With the very high cost of the RF fingerprinting equipment, carriers have chosen to leave large segments of their markets without RF fingerprinting protection.

Preventing calls based on the suspicion or knowledge that an ID has been stolen is simply a matter of removing the valid MIN/ESN pair from the validation data base. This, of course, means that the valid subscriber's phone will not work either. A new phone number must be assigned to the valid unit, or the old phone number may be used if the valid subscriber is provided with another mobile phone (with a different ESN).

Once it is recognized (or suspected) that a valid ID has been compromised, the cellular carrier typically reprograms the legitimate subscriber's phone with a new phone number (MIN), also updating the subscriber's switch records to reflect this change, thereby invalidating the old (compromised) MIN/ESN pair. Further attempts to use the old ID combination are automatically blocked in the cellular switch, protecting the legitimate subscriber. This method of protection (known as "teleconversion") is both inconvenient for the subscriber and expensive for the cellular carrier.

Even if future calls using the same stolen identities are thereby prevented, the unauthorized users simply switch to other stolen identities in a matter of seconds and continue completing unauthorized calls. This is made easy for the unauthorized users due to the availability of massive quantities of stolen valid IDs. In fact, some unauthorized users have equipment built into their phones which allows them to gather groups of valid IDs off the air, automatically programming their phones with lists of those IDs to choose from by simple telephone keypad selections. This type of phone eliminates the need for separate ID gathering equipment. It is therefore both inefficient and ineffective in the long term to apply the inconvenient and manually intensive approach of teleconversion in an attempt to prevent fraud.

Using the location of a mobile unit to establish whether a call may be completed from that unit is only effective when combined with other types of information. For instance, it would not be reasonable to assume that a first mobile unit is an unauthorized unit simply because it is operating in a cell site which has a particularly high incidence of fraud. However, if it is additionally known that a second mobile unit with the same ID is currently registered in a distant cell site and the distant cell site is known to be frequented by the valid mobile, then the location of the first mobile unit can be used as a determining factor in deciding whether or not to allow completion of call attempts from the first mobile unit.

Forcing the valid mobile user to enter a personal identification number (PIN) prior to connecting a call is another form of pre-call blocking. This mechanism, which is quite inconvenient to the valid subscriber, is subject to easy compromise of the PINs. Unauthorized users who monitor the control channel of the cellular system can follow the mobile unit to the assigned voice channel and use an inexpensive dual-tone-multi-frequency (DTMF) decoder to discover the PIN transmitted by the valid subscriber. In fact, some cellular systems allow the transmission of a PIN on the control channel (in the form of dialed digits) for temporarily activating or deactivating the phone. In this format, the PIN will be collected at the same time as the MIN and ESN as the unauthorized user receives them on the control channel.

Forcing the valid mobile user to speak a key phrase prior to connecting a call is a form of pre-call blocking which is both inconvenient to the valid subscriber and subject to analysis error and compromise over time. Unauthorized users who monitor the control channel of the cellular system can easily follow the mobile unit to the assigned voice channel and use an inexpensive voice recording device to record the key voice authentication phrases as they are spoken by the valid subscriber. Once recorded, these phrases can be played back in response to queries from the voice authentication system. Further, this technology is expensive and requires very large data storage capacity for keeping digitized samples of voice key phrases of each valid subscriber. Finally, this technology makes it very inconvenient for valid users to allow use of their phone by friends, business associates or family.

Using an authentication key (A-key) exchange has proven to be a highly effective method for preventing unauthorized calls through wireless systems. This pre-call method allows the subscriber to remain uninvolved with the authentication process. This is due to the fact that the A-key information is pre-programmed into the wireless phone and the authentication exchange is automatically accomplished when the subscriber attempts to connect a call. Unfortunately, the A-key function is only available in units manufactured after a particular date. There are (at the time of this application) approximately 25 to 30 million cellular subscribers operating phones which do not have this authentication capability. This leaves the wireless carrier with the burden of providing an alternate method of fraud prevention for these unprotected units. Additionally, as of the date of this writing, the encryption algorithm used to protect the data used in A-key exchanges has been compromised. It has been shown also that, using certain techniques, the A-key itself can be also be compromised. A Shared Secret Data (SSD) protection which is being used to enhance the A-key protection is currently the only portion of this protection scheme which has not yet been compromised.

Some pre-call profiling systems exist for providing identification of fraudulent usage of the network. there are several drawbacks to this use of subscriber profiling. First, each valid user's call activities must be individually profiled. Each user's entire profile must be compared against for every event generated by that user, requiring massive storage of data and very high powered, and therefore expensive, computers. Second, since violation of thresholds is essentially the final determining factor in determining whether fraudulent usage is occurring, it is easy for the unauthorized users to carefully fit their activities within the typical thresholds, switching from ID to ID to accomplish this for any given ID. This "flying under the radar" technique has been used quite successfully by loners in the cellular telephone systems. Another disadvantage of the profiling approach is that it can misidentify calls as fraudulent when such calls are made by valid users experiencing unusual circumstances (unusual circumstances can create the need for out-of-profile calls).

The final category on which pre-call blocking is determined is that of the dialed digits used in a call origination. Call barring based on dialed digits has long been used by the wireless and wireline carriers for preventing calls to certain destinations. The dialed digits are currently used in several ways to block call completion in a wireless telephone system.

The earliest use of call barring based on dialed digits is that of preventing completion of calls in which the dialed digits point to a non-existent destination. This is typically accomplished in the switching translation tables.

Barring calls to long distance destinations for given phones is now commonly offered as a feature to the individual subscribers of wireline and wireless carriers. Additional restrictions based on the dialed digits are also offered, such as preventing calls to certain NPA-NXX groups. In fact, ft is currently the practice of the wireless carriers to restrict all calls to international destinations unless specifically requested not to do so by the valid subscriber.

Prevention of call completion based on the dialed digits of a call attempt (either the digits dialed by the call originator or the phone number of the call originator) has significant unrealized potential for protection against unauthorized access to the wireless network. If the wireless carrier has knowledge of the digits commonly dialed by unauthorized users (or the phone number of the location used to dial unauthorized users), the carrier can use this information to prevent completion of call connections to or from these unauthorized users based on the dialed digits of their call attempts or the phone numbers of the originators of calls made to the unauthorized users. The carrier currently has available a number of mechanisms for acquiring a list of the dialed digits of calls made by unauthorized system users, as well as the phone numbers of originators of calls made to the unauthorized users. Note that calls received by unauthorized users are also of interest in that the phone number of the call origination point is often available to the carrier in the form of the well known "caller ID" feature and the standard automatic number identifier (ANI) used when connecting calls between switches.

Some of these acquisition mechanisms are inefficient and allow erroneous data to pollute the list. For example, some carriers, once fraud has been discovered on an account, simply attempt to interview the valid subscriber, asking which calls on the bill are valid and which are fraudulent. This method is disruptive to the valid subscriber, as well as slow, expensive, prone to error, and unfortunately vulnerable to subscriber dishonesty or inaccuracy. It is also highly unlikely that the valid user will know which received calls were made by unauthorized users. For all of the inconvenience and manual effort involved with this approach, it finally results in the acquisition of a relatively small number of dialed digits of unauthorized users (typically averaging 10 or 20 unique dialed digits per subscriber interview).

While some profiling systems have the ability to profile a certain amount of unauthorized user activity, the same limitations and drawbacks exist as with profiling valid user activities (misidentification errors, out-of-profile events, etc.). In addition, none of the profiling systems currently automatically create a list of dialed digits which are guaranteed to have been dialed exclusively by unauthorized users. Neither do the profiling systems currently automatically create a list of phone numbers which have dialed unauthorized users and guaranteed not to have been dialed by valid users.

On the other hand, very efficient and fully automated mechanisms exist for collecting a massive list of digits dialed by unauthorized system users as well as the phone numbers of those dialing the unauthorized users. For instance, a process which uses a device to feed specifically prepared "tagged" IDs to the unauthorized users by transmitting them over the air is accomplished by the invention described in U.S. Pat. No. 5,655,019 ("Identity protection method for use with wireless telephone systems"—Christian Christmas; Randolph W. McKeman), included herein by reference. Once unauthorized users "steal" these IDs, the carrier can monitor the use of the tagged IDs by automatically compiling the connection detail records (CDRs) generated by the switching systems. These CDRs contain not only the ID of the unauthorized phone, but also the dialed digits of the call attempt or the phone number of the call originator if the call is being received by the unauthorized user. By manipulating these CDRs generated by tagged IDs, the carrier can create a very large comprehensive list of the digits dialed by the unauthorized users who use the tagged IDs, as well a similar list of phone numbers which have dialed the tagged IDs. Since no valid subscribers use the tagged IDs, all dialed digits in the list are guaranteed to have been dialed by unauthorized users. Similarly, all phone numbers which have dialed the tagged IDs are guaranteed to have dialed an unauthorized user. This process has been shown to rapidly provide the carrier with a dialed digits list containing tens of thousands of unique entries (as well as a phone number list of similar proportion), all without involving the time of valid subscribers or carrier personnel.

Given that there are processes available for acquiring a large list of digits dialed by unauthorized users and phone numbers of those who have dialed unauthorized users, the carrier has the opportunity to make decisions about whether to block call completion based on the dialed digits used in a specific call attempt or the phone number of the originator of a call attempt. Unfortunately, some percentage digits dialed by unauthorized users are also dialed by valid users. In addition, a person dialing an unauthorized user may be using a phone owned by a business which receives valid calls from valid subscribers of the carrier's network. Assuming that the carrier does not wish to block any calls made to or from destinations dialed by valid subscribers, this renders the raw (unfiltered) list of digits dialed by unauthorized users (and phone numbers of those who have called them) of little use.

While external mechanisms currently exist which can make a determination to block or tear down calls using an interface to the switching system of a telephone network, these mechanisms are expensive and use up limited port bandwidth of the switching system. It would be faster and more cost effective to maintain a single master disallowed dialed digits list directly accessible by the switch (or group of switches) which allows the switch itself to determine (during the call setup process) whether to allow completion of a given call attempt based on the dialed digits used during the attempt. Routing translation tables in switches or groups of switches can accomplish a similar function, but are very complex to maintain. Modifying routing translation tables to keep them current with a list of disallowed destinations would be a tedious and unnecessarily complex process.

From this explanation it can be seen that a method and article are needed for automating the process of creating, in an efficient manner, a list of disallowed dialed digits which, if included in a call attempt as either the dialed digits or originating phone number, can be used as a determining factor for preventing completion of the call, eliminating from this list any dialed digits which will be dialed by valid subscribers, making this list available to a mechanism for blocking call completion through a network (based on digits dialed during the call setup process or the phone number of the originator of a call made to a network user). Additionally what is needed is a method and article which automatically creates a list of phone numbers which have dialed unauthorized network users, which, if used to originate a call to a network user, can be used as a determining factor for preventing completion of the call, eliminating from this list any phone numbers which dial valid subscribers or are dialed by valid subscribers, making this list available to a mechanism for blocking call completion through a network (based on digits dialed during the call setup process or the phone number of the originator of a call made to a network user). A method and article which meets these needs can be found in the invention described herein.

SUMMARY OF THE INVENTION

Accordingly, R is an object of this invention to provide a method and article for generating a "disallowed" list containing digits dialed by unauthorized telecommunication system users, automatically filtering this list to remove from this disallowed list any digits dialed by valid system users, then providing this disallowed list to a mechanism which blocks call completion for call attempts which contain dialed digits found in this disallowed list. This disallowed list may additionally be provided to external systems for use in further analysis of unauthorized user activity.

It is also an object of this invention to provide a method and article for including in this "disallowed" list any phone numbers which have dialed unauthorized telecommunication system users, automatically filtering this list to remove from this disallowed list any phone numbers dialed by valid system users and any phone numbers used to dial valid system users, then providing this disallowed list to a mechanism which blocks call completion for call attempts which dial phone numbers found in this disallowed list or are originated by phone numbers contained in this disallowed list. This disallowed list may additionally be provided to external systems for use in further analysis of unauthorized user activity.

It is a further object of the invention to provide a method and article for selectively removing from the disallowed list any dialed digits which connect to known valid commercial business destinations or services as well as any phone numbers which belong to commercial businesses or services.

It is additionally an object of the invention to provide a method and article for automatically determining a quantity of time (X) during which, if no connection attempts are made by non-tagged IDs to a destination on the disallowed list, this destination will remain on the disallowed list. On the other hand, if an attempt is made by a non-tagged ID to connect to a destination contained in the disallowed list during this quantity of time, the destination is removed from the disallowed list. Similarly, if no attempts are made to connect to a non-tagged ID from a phone number on the disallowed list for this duration of time (X), this phone number will remain on the disallowed list. On the other hand, if an attempt is made by a phone number on the disallowed list to connect to a non-tagged ID during this quantity of time (X), the phone number is removed from the disallowed list.

It is yet a further object of the invention to provide a method and article which allows selective application of custom filters to the disallowed list. These custom filters may be based on statistical analysis of call events from both valid subscribers and unauthorized users (i.e. quantity of events, quantity of connects, quantity of connection time, etc.). These custom filters may also be based on call activity pattern rules. The pattern based rules may be introduced from an external source, or may be created internally by the invention through application of analysis of network activity (i.e. average time between connection attempts, etc.).

It is additionally an object of the invention to provide an article and method for selectively removing from the disallowed list any dialed digits or phone numbers which are specifically predetermined to be unacceptable for blocking.

It is further an object of the invention to provide an article and method for selectively removing from the disallowed list any dialed digits which are already non-connectable through the existing network infrastructure.

It is yet a further object of the invention to provide a method and article which allows automatic removal of selected dialed digit or phone number entries from the disallowed list to or from which no connection attempt has been made for a predetermined amount of time.

It is yet a further object of the invention to provide a method and article which archives dialed digit or phone number entries which have been removed from the disallowed list. Each archived entry is marked with the date of its removal and linked to a list of any tagged IDs which have dialed the digits of the entry or have been dialed by the entry. If the dialed digits or phone number from an archived entry reappear in call activity generated by or to any tagged ID after the archived entry was removed from the disallowed list, and those dialed digits or phone number survive the filtering process, the reappearing archived entry is reinstalled onto the disallowed list. In addition, the list of tagged IDs linked to the reappearing entry is examined and any archived entries linked to the tagged IDs on this linked list (at or near the time that the reappearing entry was originally removed) are reinstalled onto the disallowed list (assuming these dialed digits or phone numbers also survive the filtering process).

It is a finally an object of the invention to provide an interface to the invention which allows control of the invention as well as data interexchange.

These objects and other features and advantages are obtained in an automated connection detail record (CDR) analysis system which interprets the dialed digits and originating phone numbers of CDRs as destination connection points (DCPS) depending on whether the call was originated by the known unauthorized user (tagged ID) or received by the tagged ID. This CDR analysis system identifies CDRs generated by incoming and outgoing calls of unauthorized network users, creating from the identified CDRs a disallowed list of digits dialed by the unauthorized users as well as phone numbers which have dialed unauthorized users, filtering this list in a sequential manner to remove from the list any dialed digits or phone numbers which are considered unacceptable as a determining factor for call completion blocking, then providing this disallowed list to a mechanism for blocking call completion based on dialed digits or originating phone number. The invention also keeps a list of the IDs which were used to make or receive the identified unauthorized calls, tagging these IDs as having been used by unauthorized users, directly linking each tagged ID to all of the entries in the disallowed list which have been dialed by the tagged ID or which have dialed the tagged ID. In addition, the invention can provide the disallowed list and the tagged ID list to other systems for further analysis of unauthorized user activity. This invention selectively provides for automatically removing and archiving disallowed list entries to or from which no connection attempt has been made for a predetermined amount of time, linking each archived entry to a list of tagged IDs which have dialed the digits in (or been dialed by the phone number of) the archived entry. The invention reintroduces into the disallowed list any archived entries which later reappear in CDRs generated by or to tagged IDs, provided the reappearing entry survives the filtering process. Additionally, the list of tagged IDs linked to the reappearing entry is examined and any archived entries linked to the tagged IDs on this list (at or near the time that the reappearing entry was originally removed) are reinstalled onto the disallowed list (assuming these dialed digits also survive the filtering process).

The archiving and restoring of disallowed list entries in the manner described above allows for a more effective response to the situation where an unauthorized user stops attempting to access a network (or be accessed through the network) for a while, then later reattempts access to the network. When the unauthorized user abandons use of the carrier's network long enough that entries related to unauthorized user are removed from (aged off) the disallowed list, followed by the same user later resuming use of the carrier's network, all of the archived entries of this unauthorized user are automatically reinstalled onto the disallowed list as soon as the first occurrence of one of the archived entries is seen in an access attempt.

Such an analysis system requires access to certain relevant data. For instance, if this system is operated for the purpose of creating a disallowed list for providing security to a cellular telephone system, the required data includes a list of MINs which are known to have been stolen by unauthorized users. Other required data includes a set of CDRs comprising call activity from valid IDs not known to have been compromised as well as IDs which are known to have been stolen by unauthorized users. If the carrier chooses to eliminate dialed destinations or phone numbers from the disallowed list which belong to commercial businesses or services, the analysis system requires a reverse directory containing the phone numbers of those businesses and services. If the carrier chooses to eliminate entries from the disallowed list which are considered unacceptable for barring (i.e. 911, 611, 555-1212, the carrier's main office phone number, etc.), the analysis system requires a separate "globally valid connection points" list containing these entries. Additionally, if the carrier chooses to eliminate dialed destinations from the disallowed list which are already non-connectable through existing network infrastructure, the analysis system requires an algorithm for determining which destinations meet this criterion.

The required data for such a CDR analysis system can be acquired through various sources through any number of well known methods. Access to the required data may be through a distributed network, data modem or via portable storage media. Once the required data is acquired, the processes of filtering, archiving, restoral and transfer of the disallowed list entries to a real-time call barring mechanism are applied to the data.

The application of these processes may be done in batch mode or in real time (or as near to real time as propagation of the data through the processes allows). In a real-time version of the invention, it is efficient (though not absolutely necessary) to retain a separate list of all digits dialed by non-tagged IDs as well as phone numbers which dial non-tagged IDs. Each entry on this non-tagged destination list (NTDL) contains a set of digits dialed by a non-tagged ID (or the phone number which dialed the non-tagged ID) along with the first date and time this entry dialed (or was dialed by) a non-tagged ID and the most recent date and time this entry dialed (or was dialed by) a non-tagged ID. Further, each entry in this non-tagged destination list may contain statistics fields for tracking the quantity of CDRs which contained these dialed digits or phone number, the total quantity of network time that connections to these dialed digits or phone number have consumed, the total number of successful connections made to these dialed digits or from this phone number, the total number of non-tagged IDs which dialed these digits or were dialed by this phone number, the total number of tagged IDs which dialed these digits or were dialed by this phone number, the average delay between attempts to connect to these dialed digits or from this phone number, and the maximum delay between attempts to connect to these dialed digits or from this phone number. This non-tagged destination list is used in a real-time version of the invention to more efficiently accomplish two tasks.

First, the non-tagged destination list is used to calculate the maximum and average time delay between attempts to connect to non-tagged destinations for entries which have more than one attempt made to or by them. These figures can be used to automatically establish a quantity of time which, if no attempts by non-tagged IDs to connect to a destination occur (or no attempts are made from this phone number to connect to a non-tagged ID) for this quantity of time, the destination or phone number can be assumed to be safe to place (or leave remaining) on the disallowed list (assuming the destination has at any time been dialed by a tagged ID or the phone number has at any time dialed a tagged ID).

Second, the non-tagged destination list is used during statistics based filtering of the disallowed list.

The desired result of applying these processes to the data is the creation of a list of dialed digits and phone numbers which can not be successfully used for completing connections through the network.

The invention can better be visualized and understood by turning to the following drawings where like elements are referenced by like numerals.

BRIEF DESCRIPTION OF THE DRAWINGS

FIG. 10 is a table which defines abbreviations used in the simplified flow charts.

DETAILED DESCRIPTION OF THE PREFERRED EMBODIMENT

Figure 1:
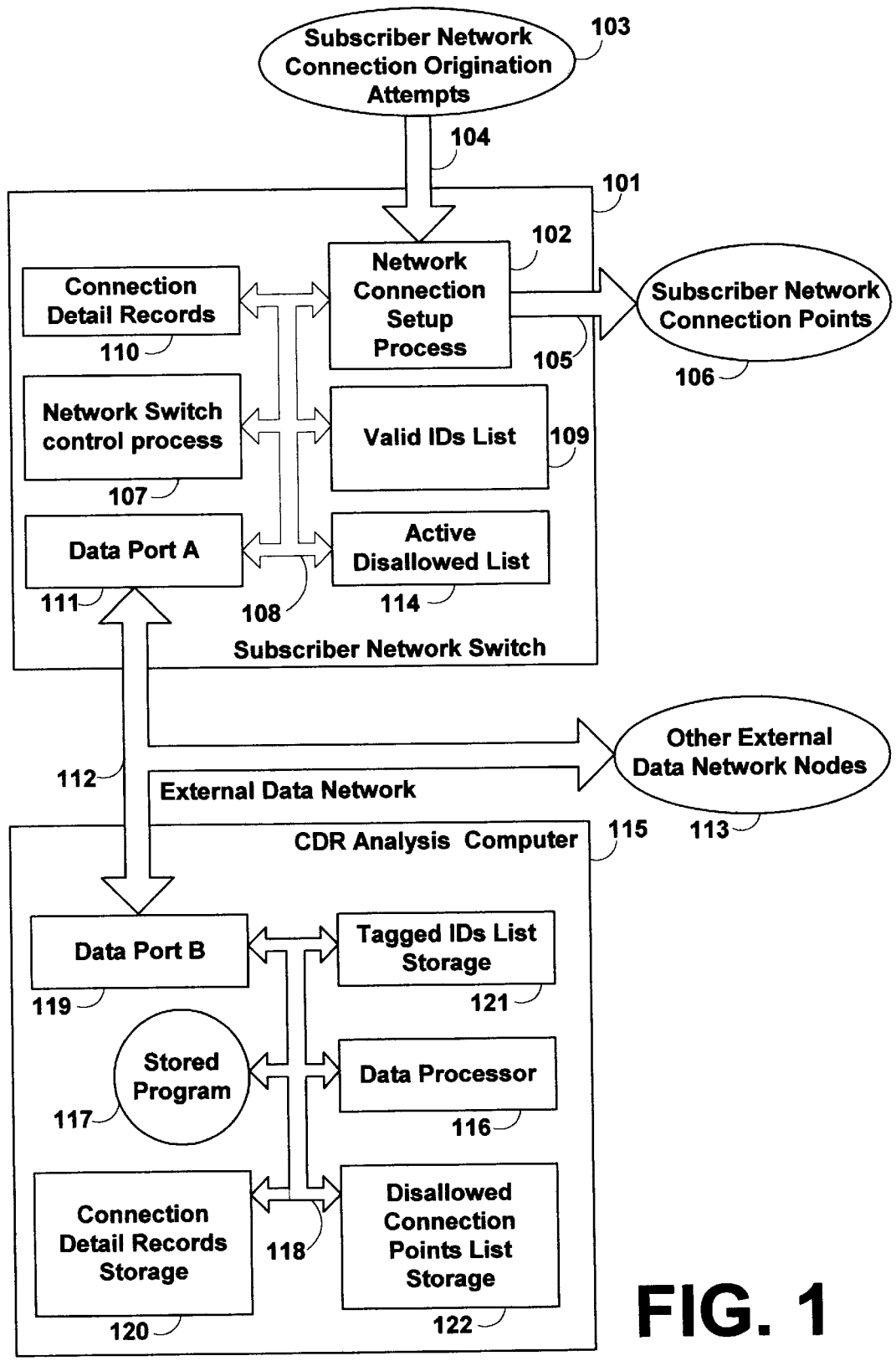
FIG. 1 is a simplified block diagram of a non-real-time version of the preferred embodiment of the invention as it interconnects to existing network infrastructure equipment.

Referring to the drawings, a preferred embodiment and alternate embodiments of the invention will be described. First, the hardware and processes will be described, following which will be a description of the operation of the software which controls the invention's hardware and processes.

It is important to note that in the description which follows, the destination connection point (DCP) can represent either the originating network node's ID (i.e. phone number or network address of the device requesting the connection) or the destination network node's ID (i.e. the phone number [dialed digits] or network address of the device to which a connection is requested). In connection detail records (CDRs) generated by typical network switches, both the originating and terminating nodes' IDs are provided. If the CDR contains information related to a connection attempt originated by a known unauthorized user or device, the DCP is assumed to be the destination address or dialed digits unless otherwise specified. If the CDR contains information related to an attempt by an originating phone number or network address to connect to a known unauthorized user or device, the DCP is assumed to be the originating phone number or network address unless otherwise specified. In most cases the detailed description below will only refer to the DCP, assuming application of this definition for the sake of brevity.

Now referring to FIG. 1 of the drawings, it can be seen that a non-real-time embodiment of the invention is shown as it interfaces with existing network infrastructure. In an existing subscriber network switch 101 there is network connection setup process 102 which is controlled by network switch control process 107 through a network switch internal data and control bus 108. In a network where the present invention does not exist, when subscriber network connection origination attempts 103 arrive via subscriber network incoming attempts path 104, the network connection setup process 102 verifies that the IDs used for the connection attempts exist in valid IDs list 109. If the IDs used in the attempts exist in valid IDs list 109, network connection setup process 102 allows the attempts to succeed, connecting the users to their requested subscriber network connection points 106 via subscriber network outgoing connections, path 105. For each of the subscriber network connection origination attempts 103, network connection setup process 102 creates a connection detail record (CDR) which is stored with all other generated CDRs in connection detail records 110. Typically, network switch control process 107, through a network switch internal data and control bus 108, transfers the CDRs contained in connection detail records 110 to data port A 111, thereby making the CDRs available to external systems via external data network 112. Such external systems are typically billing systems, fraud control systems, customer service systems and the like which are connected to other external data network nodes 113.

In a preferred embodiment of this invention, an active disallowed list 114 is added to existing subscriber network switch 101 wherein network connection setup process 102, through a network switch internal data and control bus 108, accesses active disallowed list 114, checking for the existence of a connection attempt's requested destination or originating phone number or network address on active disallowed list 114 prior to allowing the connection attempt to succeed, network connection setup process 102 blocking the attempt if the connection attempt's requested destination or originating phone number or network address is contained in active disallowed list 114.

In a non-real-time version of a preferred embodiment of this invention shown if FIG. 1, active disallowed list 114 is periodically updated by CDR analysis computer 115 via external systems via external data network 112. As can be seen in FIG. 1, CDR analysis computer 115 connects to external data network 112 via data port B 119. This not only allows CDR analysis computer 115 to access active disallowed list 114 in subscriber network switch 101, but also allows a network operator to access and control CDR analysis computer 115 from any node of external data network 112.

In a non-real-time version of a preferred embodiment of this invention, CDR analysis computer 115, under the control of data processor 116 operating instructions contained in stored program 117, periodically creates a pending disallowed list (PDL) which is stored in disallowed connection points list storage 122, then periodically transferred to active disallowed list 114 via CDR analysis computer internal data and control bus 118, data port B 119, external data network 112, data port A 111, and finally network switch internal data and control bus 108.

Creation of the PDL by CDR analysis computer 115 is accomplished as follows: A tagged IDs list (TIDL) is stored in tagged IDs list storage 121. The IDs contained in this list are the network equipment IDs or subscriber IDs which are known to currently be used exclusively for unauthorized network access. As CDRs arrive via external data network 112, data port B 119, and finally CDR analysis computer internal data and control bus 118, data processor 116 transfers the CDR via CDR analysis computer internal data and control bus 118 for storage in connection detail records storage 120. Periodically, data processor 116 determines the greatest time lapse between attempts to connect to or from any given destination connection point (DCP) contained in the CDRs generated by non-tagged IDs and stored in connection detail records storage 120. Data processor 116 then determines which DCP has the greatest time lapse, assigning this value to variable X. Note that the value of X can alternately be determined arbitrarily by the network operator. Next, data processor 116 loops through the CDRs contained in connection detail records storage 120, comparing the ID contained in each CDR to the entries contained in TIDL stored in tagged IDs list storage 121. If a comparison reveals that a CDR contains a tagged ID and the CDR has a DCP not currently contained in a PDL entry stored in disallowed connection points list storage 122, data processor 116 creates an entry containing the DCP of the CDR, adding that entry to the PDL stored in disallowed connection points list storage 122. Note that in an alternate embodiment of the invention as described later in this specification, the DCP of the CDR can be subject to further examination prior to a decision to add the DCP to the PDL. If a comparison reveals that a CDR contains a non-tagged ID and the CDR has a DCP that is currently contained in a PDL entry stored in disallowed connection points list storage 122, data processor 116 checks the date and time of the CDR to determine whether the CDR is older than value X. If the CDR is not older than value X, then data processor 116 removes the matching DCP entry in the PDL, or alternately marks the PDL entry for later archiving prior to updating valid IDs list 109.

In this manner, CDR analysis computer 115 creates a PDL which contains DCP entries to which connection attempts have been made by unauthorized users, but which no valid users have attempted to make connection for at least X time. This process and the software which controls it are described in greater detail later in this specification. In a similar manner, the CDR analysis computer 115 adds entries to the PDL which contain DCPs from which attempts have been made to connect to unauthorized users, but which have not attempted to make connection to valid users for at least X time. This process and the software which controls it are described in greater detail later in this specification.

Figure 2:
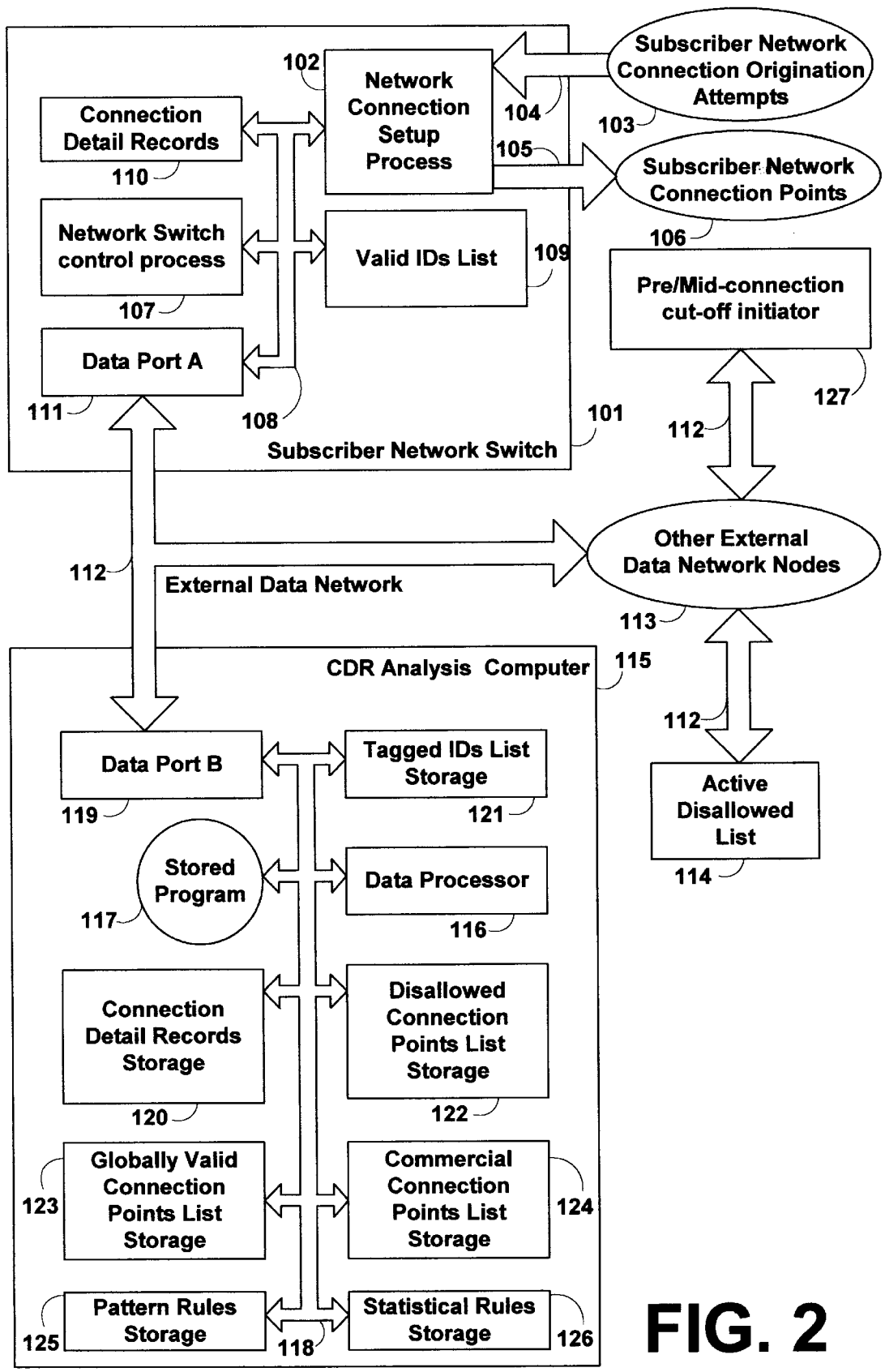
FIG. 2 is a simplified block diagram of an alternate embodiment of the invention as it interconnects to existing network infrastructure equipment.

Now referring to FIG. 2, the interface to existing network infrastructure of an alternate embodiment of the invention is described. In this embodiment of the invention, active disallowed list 114 is connected to external data network 112 in a location outside the subscriber network switch 101. Also connected to external data network 112 in a location outside the subscriber network switch 101 is a pre/mid-connection cut-off initiator 127. The arrangement of the switch-external pre/mid-connection cut-off initiator 127 is similar to the well known external Home Location Register (HLR) currently in use by wireless telephone networks wherein, prior to connection of each call attempt, the features and status of the phone are checked in the HLR.

In this embodiment, a pre-connection version of a CDR is generated for each connection attempt by network connection setup process 102 prior to allowing the connection attempt to succeed. These pre-connection CDRs are received by pre/mid-connection cut-off initiator 127 via network switch internal data and control bus 108, data port A 111, and finally external data network 112. As each pre-connection CDR is received, pre/mid-connection cut-off initiator 127 accesses active disallowed list 114 via external data network 112, determining whether the DCP of the pre-connection CDR is contained in an entry of active disallowed list 114. If the DCP of the pre-connection CDR is contained in an entry of active disallowed list 114, pre/mid-connection cut-off initiator 127 responds by sending a message to network connection setup process 102 indicating that the connection attempt should be blocked. Alternately, if the connection has already been made, pre/mid-connection cut-off initiator 127 can respond by sending a message to network switch control process 107 that the in-progress connection should be terminated.

Note that, in the alternate embodiment shown in FIG. 2, no restrictions exist which would prevent active disallowed list 114 from being located internal to pre/mid-connection cut-off initiator 127, thereby eliminating the need for a separate network connection between the two components.

Referring again to FIG. 2, it can be seen that CDR analysis computer 115 contains the additional components of globally valid connection points list storage 123, commercial connection points list storage 124, pattern rules storage 125, and statistical rules storage 126, each of these components made accessible to data processor 116 via CDR analysis computer internal data and control bus 118. Globally valid connection points list storage 123 contains a list of DCPs which are considered by the network operator to be unacceptable for blocking (i.e. in the case of the wireless telephone network, 911, 611, 555-1212, the carrier's main office telephone number, etc.). Commercial connection points list storage 124 contains a list of DCPs which are owned or operated by commercial interests (i.e. businesses, business services, public services, etc.). Pattern rules storage 125 contains a set of rules which, when applied to a group of CDRS, filter out DCPs based on pattern analysis of certain aspects of the connection attempt activities (i.e. average delay between connections attempts to those DCPs, etc.). Statistical rules storage 126 contains a list of rules which, when applied to a group of CDRs, filter out DCPs based on statistical analysis of certain aspects of the connection attempt activities (i.e. quantity of events, quantity of connects, quantity of connection time, etc.).

These optional components are primarily used to provide additional criteria for the removal of entries from the PDL, or for preventing the introduction of entries into the PDL. This enhances the network operator's network performance safety factor as it relates to preventing unnecessary blockage of connections which may be attempted by valid subscribers. In this case, if a DCP from a tagged ID is not eliminated from being added to the PDL (there were no attempts made by a non-tagged ID to connect to the DCP within X time or there were no attempts made by the DCP to connect to a non-tagged ID within X time), prior to adding the DCP to the PDL, data processor 116 passes the DCP through filters based on the data contained in globally valid connection points list storage 123 and commercial connection points list storage 124, and the rules contained in pattern rules storage 125 and statistical rules storage 126.

For instance, before adding a DCP to the PDL, data processor 116 checks to see if the DCP is contained in globally valid connection points list storage 123. If the DCP is contained in globally valid connection points list storage 123, data processor 116 does not add the DCP to the PDL. Additionally, before adding a DCP to the PDL, data processor 116 checks to see if the DCP is contained in commercial connection points list storage 124. If the DCP is contained in commercial connection points list storage 124, data processor 116 does not add the DCP to the PDL. Further, before adding a DCP to the PDL, data processor 116 examines the CDRs stored in connection detail records storage 120 which record attempts to connect to this DCP, applying to those CDRs the statistical rules contained in statistical rules storage 126. If the statistical rules determine that the DCP should not be added to the PDL, data processor 116 does not add the DCP to the PDL. Finally, before adding a DCP to the PDL, data processor 116 examines the CDRs stored in connection detail records storage 120 which record attempts to connect to or from this DCP, applying to those CDRs the pattern rules contained in pattern rules storage 125. If the pattern rules determine that the DCP should not be added to the PDL, data processor 116 does not add the DCP to the PDL. Note that these additional filtering and analysis steps are each individually optional.

Figure 3:
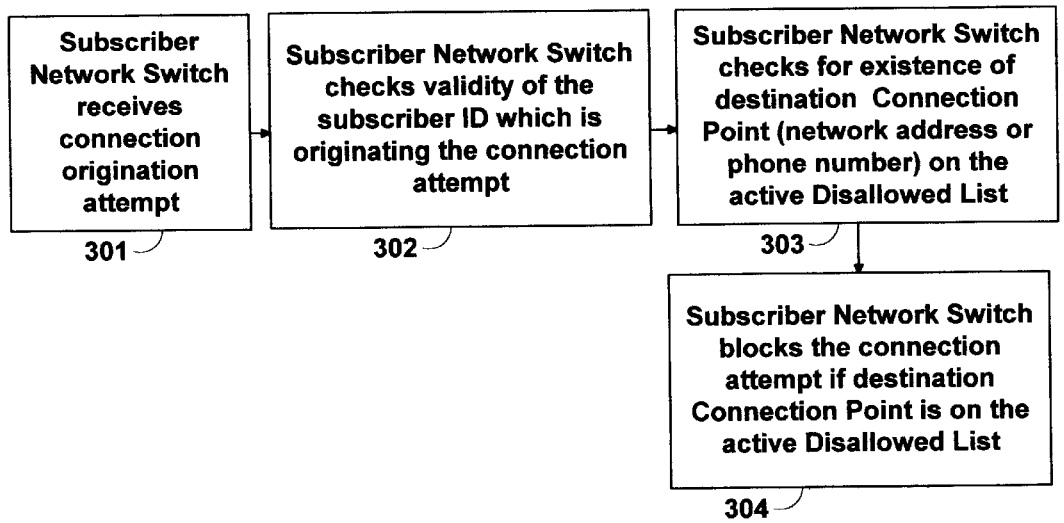
FIG. 3 is a simplified block diagram of the connection blocking process according to the preferred embodiment of the invention.

Now referring to FIG. 3, a process is described for using a switch-internal active disallowed list (as with the active disallowed list 114 shown in FIG. 1) to determine whether a network connection attempt should be blocked. In FIG. 3, the first step is shown in process block 301 which describes a subscriber network switch (as with the subscriber network switch 101 shown in FIG. 1) receiving a connection origination attempt. In the next step, shown in process block 302, the subscriber network switch checks the validity of the subscriber ID which is originating the connection attempt, as is typically done in current art. Following this, as described in process block 303, the subscriber network switch checks for the existence of the DCP of the connection attempt in the active disallowed list. Finally, as is shown in process block 304, the subscriber network switch blocks the connection attempt if the DCP of the connection attempt is contained in the active disallowed list. This process differs from current art in the addition of the step which checks for the existence of the DCP of the connection attempt in the active disallowed list.

Figure 3A:
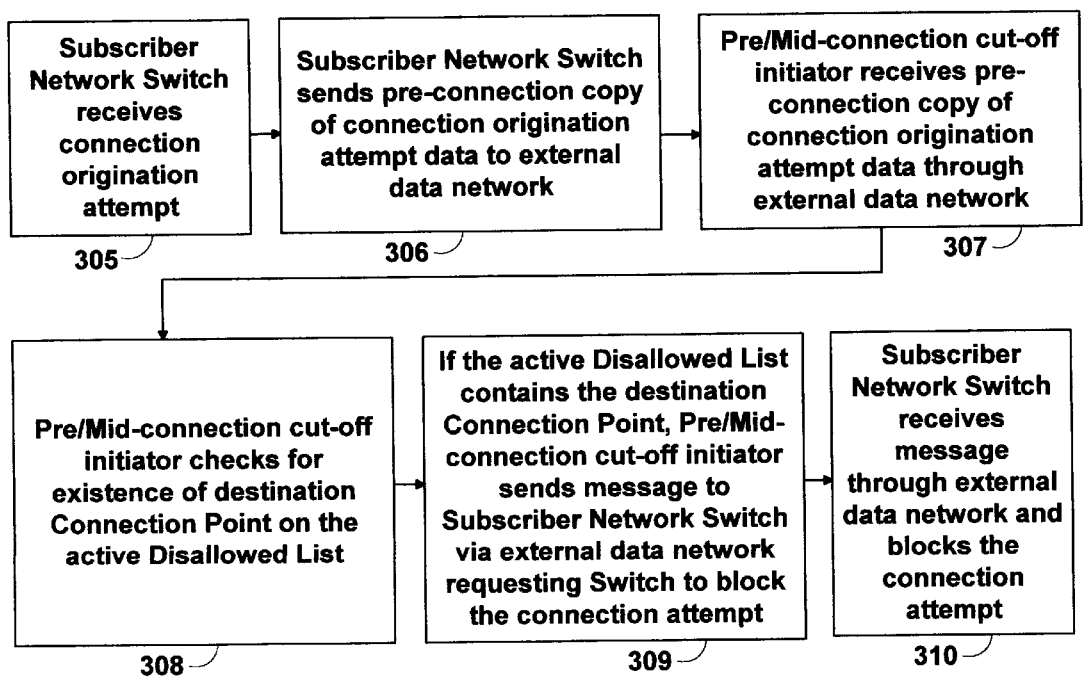
FIG. 3a is a simplified block diagram of the connection blocking process according to an alternate embodiment of the invention.

Now referring to FIG. 3a, a process is described where a pre/mid-connection cutoff initiator (as with the pre/mid-connection cut-off initiator 127 shown in FIG. 2) uses a switch-external active disallowed list (as with the active disallowed list 114 shown in FIG. 2) to determine whether a network connection attempt should be blocked. In FIG. 3a, the first step is shown in process block 305 which describes a subscriber network switch (as with the subscriber network switch 101 shown in FIG. 2) receiving a connection origination attempt. In the next step, shown in process block 306, the subscriber network switch sends a pre-connection copy of the connection origination attempt data (including the DCP of the attempt) to an external data network (as with the external data network 112 shown in FIG. 2) as is typically done in current art where an external HLR is used in a wireless network. The pre/mid-connection cut-off initiator receives, through the external data network, this pre-connection data as shown in process block 307. The pre/mid-connection cut-off initiator then checks for the existence of the DCP of the connection attempt in the active disallowed list, as shown in process block 308. If the active disallowed list contains the DCP of the connection attempt, the pre/mid-connection cut-off initiator sends a message to the subscriber network switch requesting that the connection attempt be blocked, as shown in process block 309. Finally, as is shown in process block 310, the subscriber network switch blocks the connection attempt per the request message received from the pre/mid-connection cut-off initiator. This process differs from current art in the addition of the step which checks for the existence of the DCP of the connection attempt in the active disallowed list.

Figure 4:
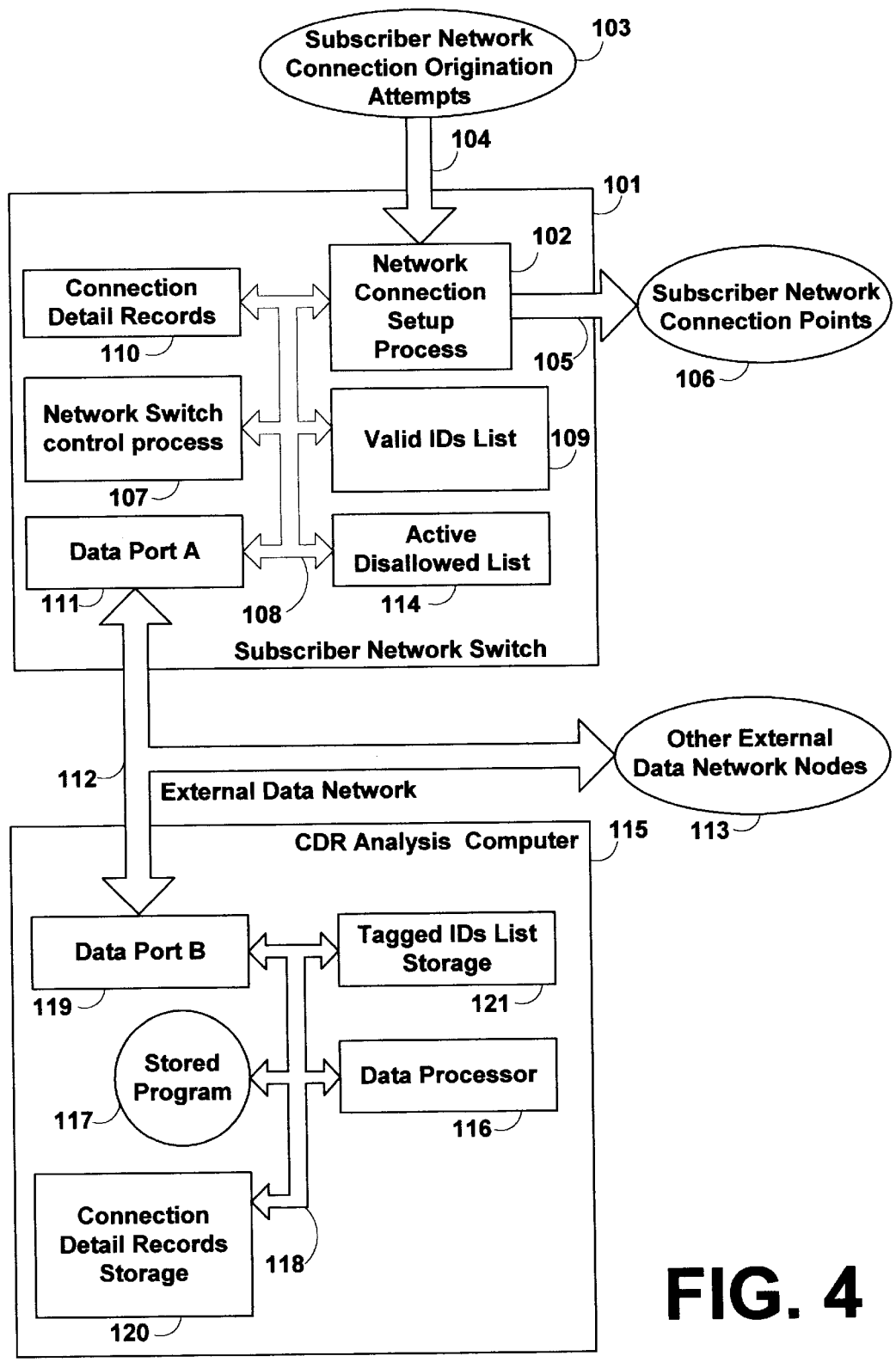
FIG. 4 is a simplified block diagram of a real-time version of the preferred embodiment of the invention as it interconnects to existing network infrastructure equipment.

Now referring to FIG. 4, interconnection of a real-time version of the preferred embodiment invention to existing network infrastructure is shown. In this real-time embodiment of the invention, the pending disallowed list (PDL), along with Its storage location (disallowed connection points list storage 122 as shown in FIG. 1) are not required and therefore are eliminated from CDR analysis computer 115. Additionally, connection detail records storage 120 (as shown in FIG. 1) is not required and is also eliminated from CDR analysis computer 115. Instead, as seen in FIG. 4, a non-tagged destinations list storage 128 is connected to data processor 116 via CDR analysis computer internal data and control bus 118 in CDR analysis computer 115.

Non-tagged destinations list storage 128 stores a non-tagged destinations list (NTDL), each entry of which contains a DCP which has had attempts to connect to it made by non-tagged IDs or which has attempted to connect to non-tagged IDs. Each entry in this NTDL also has fields for storing data related to its DCP, such as an earliest attempt (EA) field which stores the date/time of the earliest recorded attempt from a non-tagged ID to connect to this DCP or the earliest recorded attempt from this DCP to connect to a non-tagged ID, and a latest attempt (LA) field which stores the date/time of the latest (most recent) recorded attempt from a non-tagged ID to connect to this DCP or the latest (most recent) recorded attempt from this DCP to connect to a non-tagged ID.

In this real-time embodiment of the invention, the active disallowed list 114 in subscriber network switch 101 is updated by CDR analysis computer 115 in real-time as each new DCP is discovered which is determined to belong on the active disallowed list 114. In this embodiment, as each CDR is received by CDR analysis computer 115 via external data network 112 and data port B 119, data processor 116 determines whether the CDR was originated from (or has as its destination) an ID which is contained in the tagged IDs list (TIDL) stored in tagged IDs list storage 121.

If data processor 116 determines that the ID or destination of the CDR is contained in the TIDL, data processor 116 determines whether the DCP of the CDR is contained in active disallowed list 114. If data processor 116 determines that the DCP of the CDR is contained in active disallowed list 114, data processor 116 updates the statistical fields of the DCP's entry in active disallowed list 114, additionally linking the DCP entry in active disallowed list 114 to the tagged ID (either the originating ID or destination) of the CDR.

If data processor 116 determines that the ID of the received CDR is contained in the TIDL (the CDR was generated by a tagged ID) or the destination of the received CDR is contained in the TIDL (the CDR was generated by a node which was attempting to connect to a tagged ID), but the DCP of the received CDR is not contained in active disallowed list 114, data processor 116 proceeds to check for the existence of the DCP of the received CDR in the NTDL. If the DCP of the received CDR is in the NTDL and the LA field in the DCP's entry of the NTDL is not older than X time, data processor 116 does not add the DCP of the received CDR to active disallowed list 114. If, however, the DCP's entry of the NTDL is older than X time, data processor 116 considers the DCP a candidate for entry into active disallowed list 114. In an alternative embodiment of the invention (as depicted in FIG. 2) prior to adding the DCP to active disallowed list 114, data processor 116 could optionally further examine the DCP, filtering it out based on other criteria described above.

Once a decision is made by data processor 116 to add the DCP of the received CDR to active disallowed list 114, data processor 116 adds the new DCP entry to active disallowed list 114, then links the tagged ID of the received CDR to the DCP. Next, if the DCP of the received CDR is added to active disallowed list 114, data processor 116 loops through the TIDL, reintroducing to active disallowed list 114 (after any additional optional filtering) any archived DCP entries which are linked to the tagged ID of the received CDR or to any other tagged ID which has been linked to the DCP of the received CDR. In this manner, the reappearance of a single DCP related to an unauthorized user will cause all DCPs previously related to that unauthorized user to be restored automatically to active disallowed list 114 without waiting to see them dialed by a tagged ID or used to dial a tagged ID. This more rapidly provides the additional protection from unauthorized access by that user.

If data processor 116 determines that the ID or destination of the received CDR is not contained in the tagged IDs list (TIDL) stored in tagged IDs list storage 121 (the CDR was generated by a non-tagged ID or was generated by an attempt to connect to a non-tagged ID), data processor 116 determines whether the DCP of the CDR is contained in the NTDL stored in non-tagged destinations list storage 128. If the DCP of the CDR is not contained in the NTDL, data processor 116 adds the DCP of the CDR to the NTDL. If the DCP of the CDR is contained in the NTDL (or after it is added to the NTDL), data processor 116 updates the EA and LA fields for that DCP's entry in the NTDL based on whether the date/time of the CDR is earlier than the EA field or more recent than the LA field of the entry.

After each received CDR is processed in real-time by data processor 116 as described above, data processor 116 recalculates the quantity of time represented by the value of variable X.

Note that in FIG. 4 the active disallowed list 114 is shown as being located in subscriber network switch 101. It would be obvious to a person reasonably skilled in this art that (due to the nature of data network communications) active disallowed list 114 could also be located at any node of external data network 112 without impacting the ability of data processor 116 to update active disallowed list 114 in real-time.

In FIG. 4, FIG. 1 and FIG. 2, data processor 116 periodically removes entries from active disallowed list 114 if no attempts to connect to their DCP or no attempt to make a connection from their DCP have been seen for X time. This prevents the size of active disallowed list 114 from becoming unnecessarily large. This "aging off" process archives the removed entries, keeping their links to tagged IDs active so that the archived entries may be automatically reintroduced to active disallowed list 114 should any links to the DCPs of the archived entries warrant such action.

Thus it can be seen (in FIG. 4, FIG. 1 and FIG. 2) that data processor 116, following instruction contained in stored program 117, controls the processes of creating a list of network destination connection points (either "dialed" by an unauthorized user or used to "dial" an unauthorized user) which can be used to control unauthorized access to the subscriber network. This can be done in a non-real-time (batch) mode or in a real-time mode. A preferred structure of a simplified flow chart of the set of instructions (software) contained in stored program 117 is described below.

SOFTWARE DESCRIPTION

Figure 5:
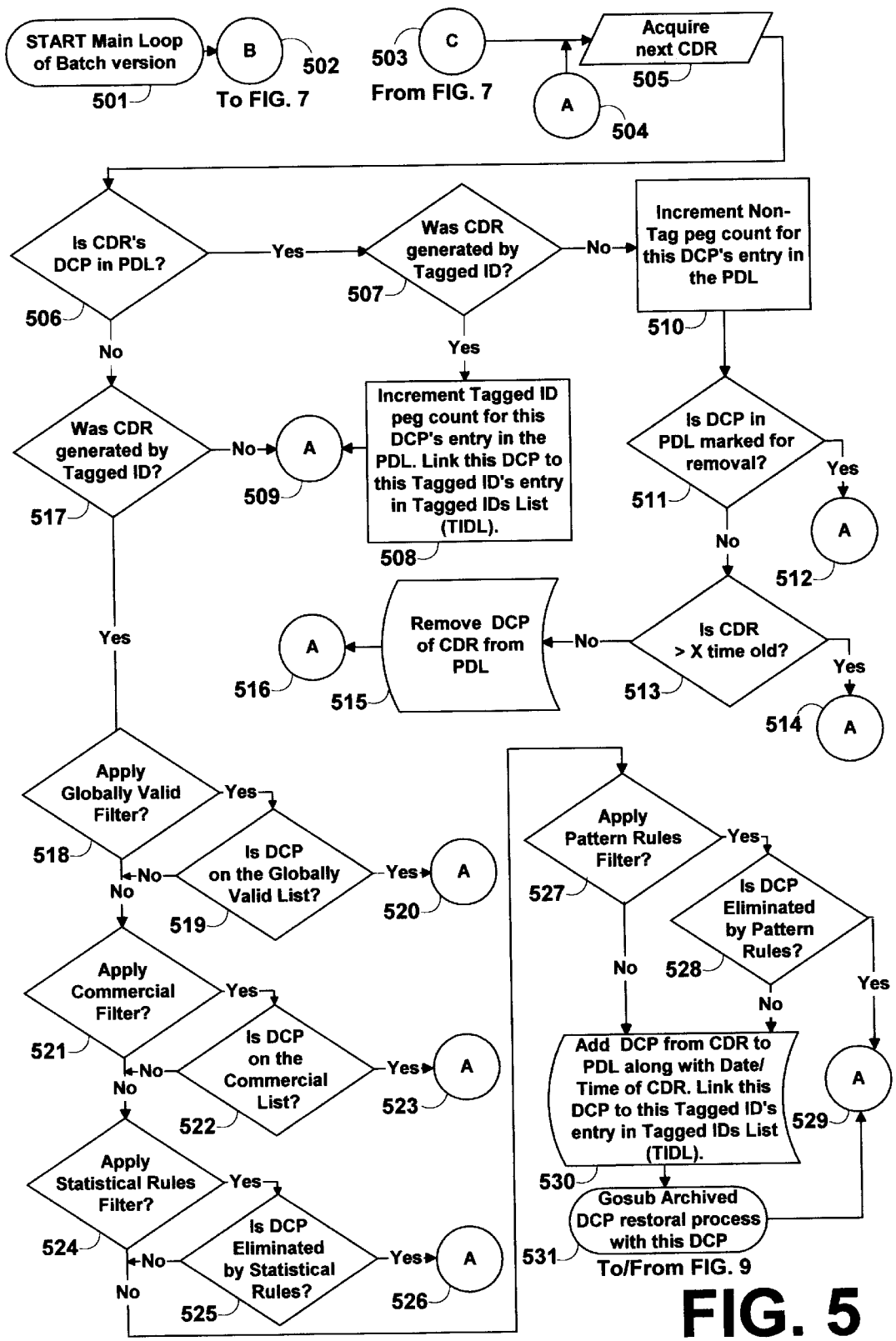
FIG. 5 is a simplified flow chart of the main loop of the controlling software program for a non-real-time version of the preferred embodiment of the invention.
Figure 6:
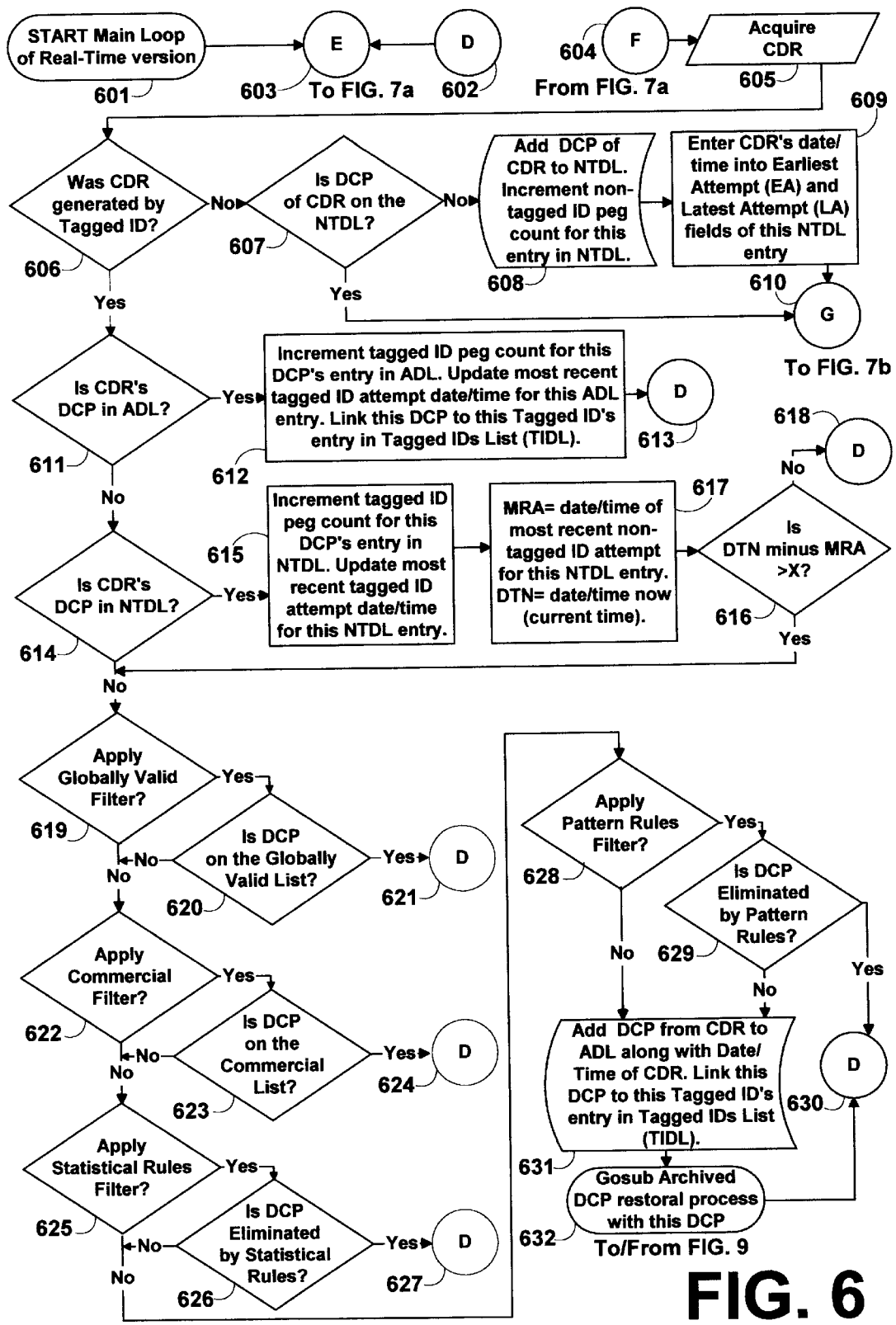
FIG. 6 is a simplified flow chart of the main loop of the controlling software program for a real-time version of the preferred embodiment of the invention.
Figure 7:
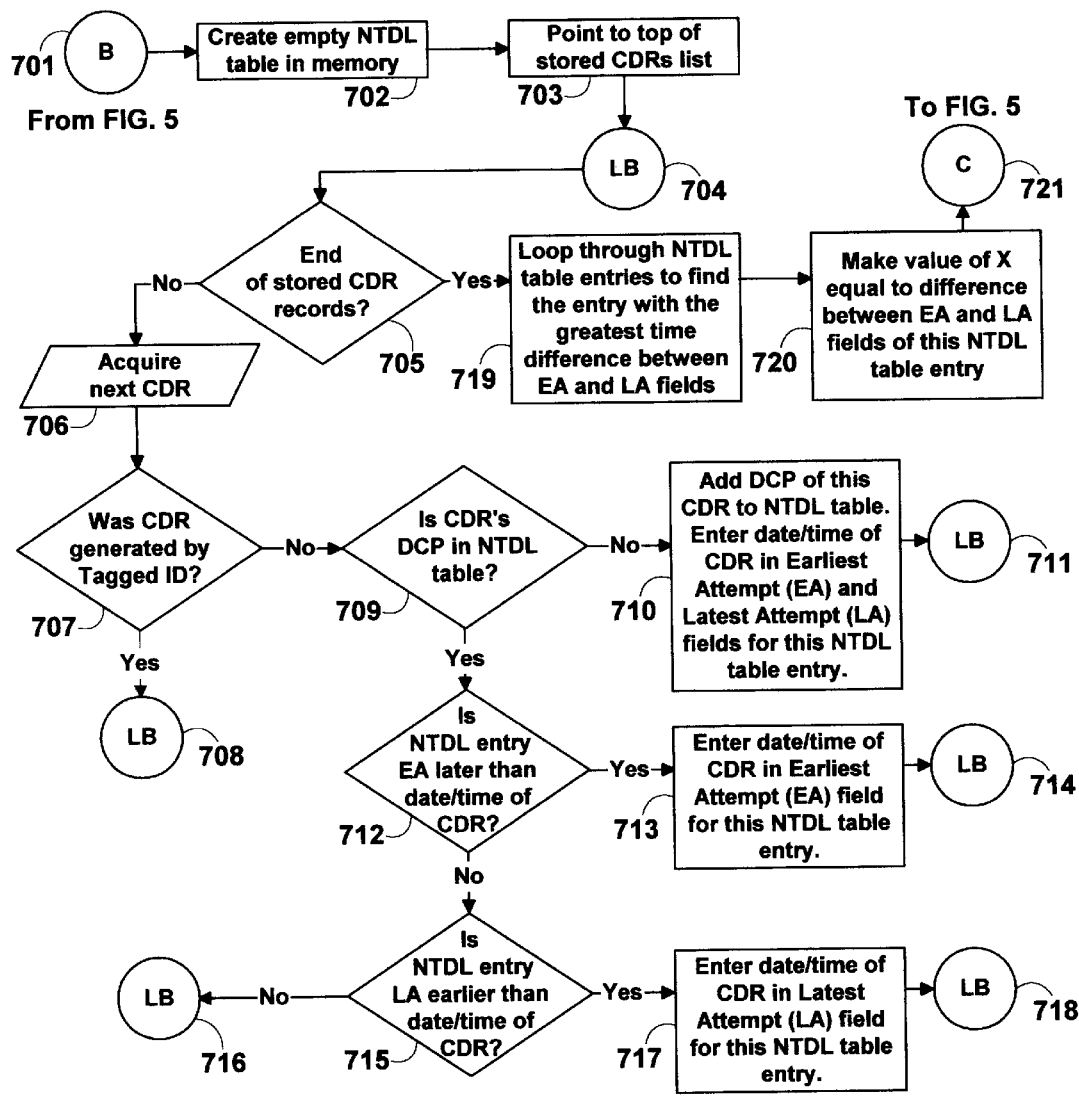
FIG. 7 is a simplified flow chart of the software controlling the process of calculating the value of time X for a non-real-time version of the preferred embodiment of the invention.
Figure 7A:
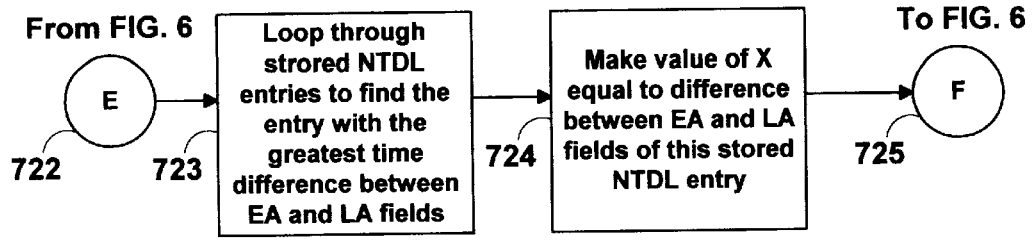
FIG. 7a is a simplified flow chart of the software controlling the process of calculating the value of time X for a real-time version of the preferred embodiment of the invention.
Figure 7B:
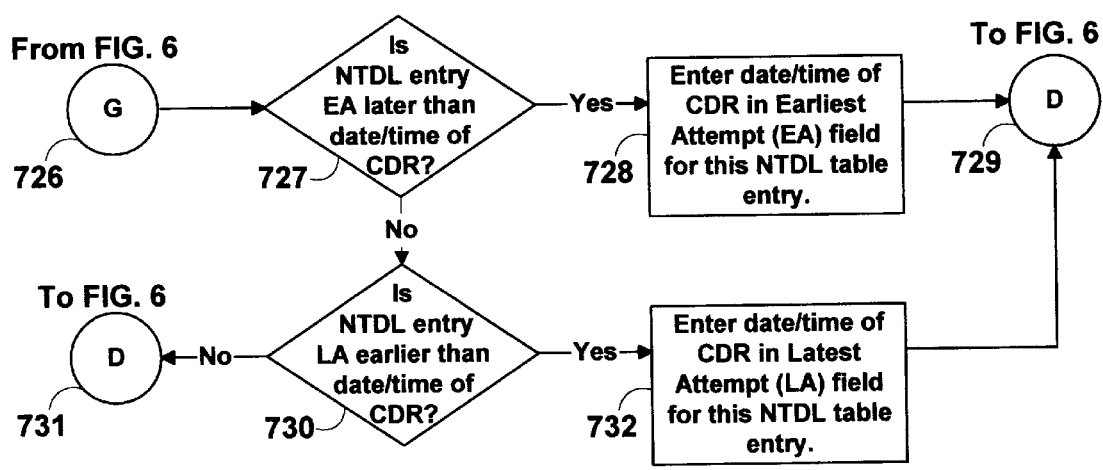
FIG. 7b is a simplified flow chart of the software controlling the process of determining the earliest and latest date/time of attempts to connect to or from a network point in a real-time version of the preferred embodiment of the invention.
Figure 8:
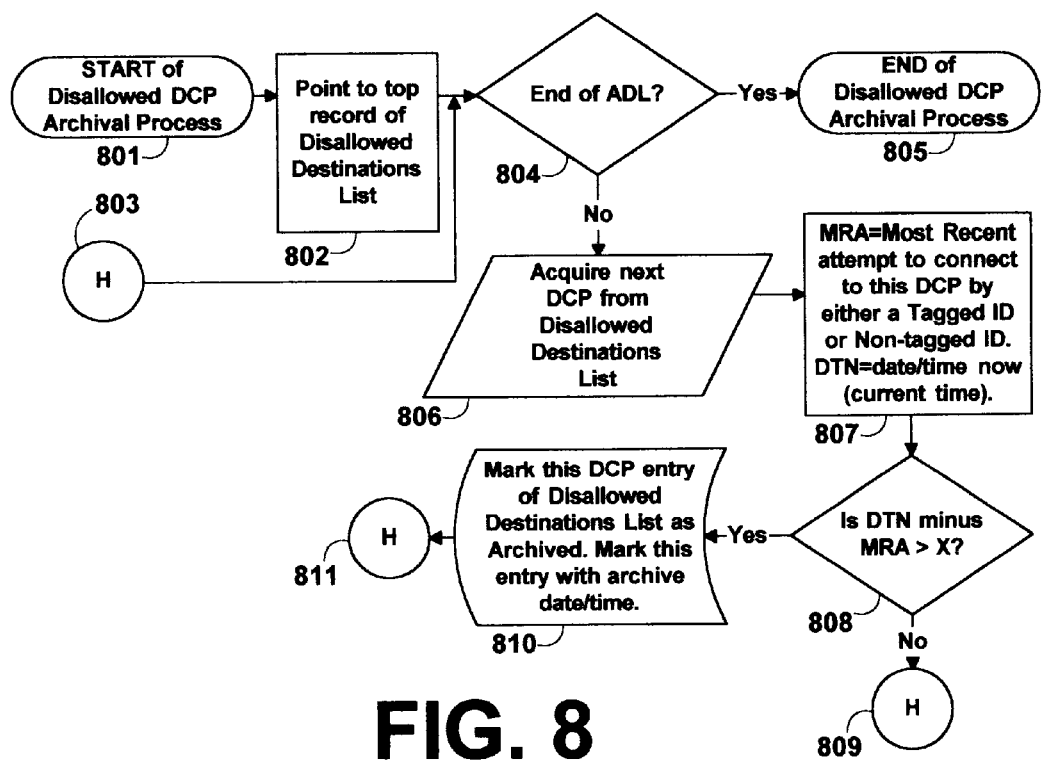
FIG. 8 is a simplified flow chart of the software controlling the process of removing and archiving disallowed list entries according to the preferred embodiment of the invention.
Figure 9:
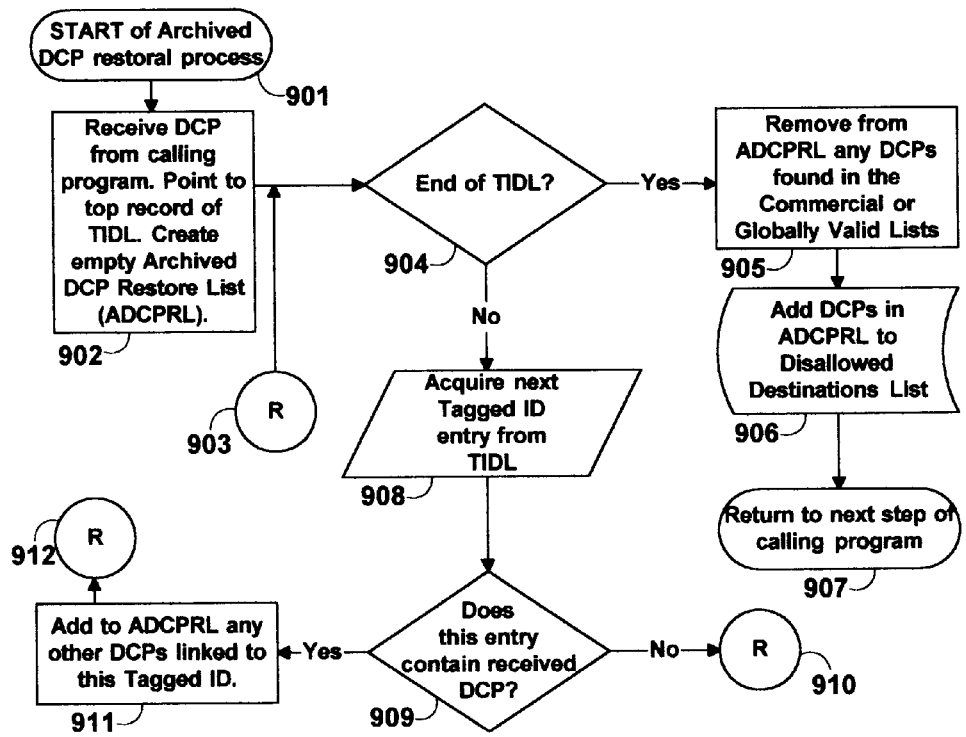
FIG. 9 is a simplified flow chart of the software controlling the process of restoring archived entries to the disallowed list according to the preferred embodiment of the invention.

In FIG. 5, FIG. 6, FIG. 7, FIG. 7a, FIG. 7b, FIG. 8 and FIG. 9 simplified flow charts describe the software which controls the processes of the invention. FIG. 5 shows a flow chart describing a non-real-time (batch) version of the software. FIG. 7 shows a sub-process of the non-real-time (batch) version of the software which is called by the flow chart of FIG. 5. FIG. 6 shows a flow chart describing a real-time version of the software. FIG. 7a and FIG. 7b show sub-processes of the real-time version of the software which are called by the flow chart of FIG. 6. FIG. 8 shows a flow chart describing a process which is run periodically (in either the real-time or non-real-time versions of the invention) for archiving aged entries contained in the disallowed list. FIG. 9 shows a flow chart describing a sub-process which restores archived disallowed list entries to the disallowed list when a link analysis warrants such action. The sub-process shown in FIG. 9 may be called by either the non-real-time (batch) version shown in FIG. 5 or the real-time version shown in FIG. 6.

Now referring to FIG. 5, the start of batch version main loop 501 steps immediately to flow point 502 (labeled B in FIG. 5) where the software calls the sub-process shown in FIG. 7. Since the batch version of the software is run only periodically, the sub-process of FIG. 7 is only called once to establish a quantity of time to be stored in variable X. This is done at the beginning of a running of the batch version, since the same value of X is used throughout the rest of the processes performed by the batch version.

Referring now to the sub-process of FIG. 7, the software enters at flow point 701 (labeled B in FIG. 7) which steps immediately to process block 702 which creates an empty list table in temporary memory storage. This non-tagged destination list (NTDL) table is structured to hold entries representing non-tagged ID destinations (DCPs) along with the earliest recorded attempt (EA) and latest (most recent) recorded attempt (LA) to connect to or from each DCP entry. After this empty list table is created, the software steps to process block 703 where a pointer is set to the top of a list of stored connection detail records (CDRs), allowing the software to later loop through the CDR list from the first CDR entry to the last CDR entry. From here the software steps to flow point 704 (labeled LB in FIG. 7). Flow point 704 is a re-entry point of this sub-process' software loop. From flow point 704 the software steps immediately to decision block 705 where an end of CDR list condition is checked. If the pointer is not at the end of the CDR list, the software steps to data input block 706 where the next CDR on the CDR list is acquired. Once the next CDR has been acquired, the software begins processing the CDR in decision block 707 where it is determined whether the CDR was generated by a tagged ID. If the CDR was generated by a tagged ID, the software steps to flow point 708 which immediately steps the software back to flow point 704 (the top of this loop). This is done since CDRs generated by tagged IDs are not used in determining the value of variable X. If, instead, it is determined in decision block 707 that the CDR was not generated by a tagged ID, the software steps to decision block 709 where the DCP of the CDR generated by a non-tagged ID is compared against the DCP entries in the NTDL table.

If the DCP of the CDR is not found in the NTDL table, the software steps to process block 710 where an entry containing the DCP of the CDR is added to the NTDL table. In this manner, as the software loops through the stored CDRs, the software builds the NTDL table with a non-duplicating list of DCPs which have been seen in CDRs generated by a non-tagged IDs. Before leaving process block 710, the software enters the date and time of the CDR into the EA and LA fields of the new NTDL table entry. From here the software steps to flow point 711 which immediately steps the software back to flow point 704 (the top of this loop).

If in decision block 709 the DCP of the CDR is found to already exist in the NTDL table, the software steps to decision block 712 where the date and time of the CDR is compared to the date and time contained in the EA field of the existing NTDL table entry. If the date and time of the EA field is later (more recent) than the date and time of the CDR, the software steps to process block 713 where the software replaces the date and time in the EA field with the date and time of the CDR. From here the software steps to flow point 714 which immediately steps the software back to flow point 704 (the top of this loop).

If in decision block 712 the date and time of the EA field is found to be earlier than the date and time of the CDR, the software steps to decision block 715 where the date and time of the CDR is compared to the date and time contained in the LA field of the existing NTDL table entry. If the date and time of the LA field is earlier than the date and time of the CDR, the software steps to process block 717 where the software replaces the date and time in the LA field with the date and time of the CDR. From here the software steps to flow point 718 which immediately steps the software back to flow point 704 (the top of this loop).

If in decision block 715 the date and time of the LA field is found to be later (more recent) than the date and time of the CDR, the software steps to flow point 716 which immediately steps the software back to flow point 704 (the top of this loop).

After being returned to the top of this loop, the software steps once again from flow point 704 immediately to decision block 705. If in decision block 705 it is determined that the pointer is at the bottom of the CDR list (all of the CDRs have been processed), the software steps to process block 719 where the software loops through all of the NTDL entries to find the one entry which contains the largest difference in time between its EA and LA date/time field values. After locating this NTDL entry, the software steps to process block 720 where the value of variable X is replaced with the value representing the difference in time between this entry's EA and LA date/time field values.

In this manner the sub-process of FIG. 7 determines a value for variable X. From process block 720 the software steps to flow point 721. From flow point 721 (labeled C in FIG. 7) the software returns to the calling program of FIG. 5.

Referring now again to FIG. 5, the software returns to the calling program through flow point 503 (labeled C in FIG. 5). Note that at this time, a pointer is pointing to the top of a stored group of CDRs. From here the software steps immediately to data input block 505 where the next stored CDR (in this case, the first CDR in the stored list) is acquired. Once the CDR is acquired, the software proceeds to decision block 506 where the DCP of the CDR is compared to entries contained in the pending disallowed list (PDL). The PDL is comprised of DCPs which will be later transferred to an active disallowed list (ADL) to be used by a mechanism for preventing connections which contain DCPs on the ADL. Each DCP entry in the PDL has fields which contain peg counts for the DCP, including how many tagged IDs have been connected to the DCP as well as how many non-tagged IDs have been connected to the DCP. These fields may be used to perform statistical analysis of the entries in the PDL.

If the DCP of the CDR is found in the PDL, the software steps to decision block 507 where the ID of the CDR is compared to entries of the tagged ID list (TIDL). If the ID of the CDR is found in the TIDL (the CDR was generated by a tagged ID), the software steps to process block 508 where the tagged ID peg count is incremented for the PDL entry for the DCP of the CDR. Additionally, the tagged ID entry in the TIDL found to match the ID of the CDR is linked to the DCP of the PDL entry. From here the software steps to flow point 509 which immediately steps the software back to flow point 504 (the top of this loop labeled A).

If in decision block 507 the ID of the CDR is not found in the TIDL (the CDR was not generated by a tagged ID), the software steps to process block 510 where the non-tagged ID peg count is incremented for the PDL entry for the DCP of the CDR. From here the software steps to decision block 511 where it is determined whether the DCP entry in the PDL is marked for removal. If the DCP entry in the PDL is marked for removal, the software steps to flow point 512 which immediately steps the software back to flow point 504 (the top of this loop).

If in decision block 511 it is determined that the DCP entry in the PDL is not marked for removal, the software steps to decision block 513 where it is determined whether the date and time of the CDR is older than the current time minus the value of variable X. If the date and time of the CDR is older than the current time minus the value of variable X, the software steps to flow point 514 which immediately steps the software back to flow point 504 (the top of this loop).

If in decision block 513 it is determined that the date and time of the CDR is not older than the current time minus the value of variable X, the software steps to stored data block 515 where the entry in the PDL which matches the DCP of the CDR is removed from the PDL. In this manner, any DCPs contained in the PDL which have been connected to a non-tagged ID within X time are automatically removed from the PDL. Conversely, any DCPs contained in the PDL which have not been connected to a non-tagged ID within X time will remain in the PDL for later transfer to an ADL to be used for blocking connections. From stored data block 515 the software steps to flow point 516 which immediately steps the software back to flow point 504 (the top of this loop).

If in decision block 506 it is determined that the CDR's DCP is not found in the PDL, the software steps to decision block 517 where the ID of the CDR is compared to entries in the TIDL. If the ID of the CDR is not found in the TIDL (the CDR was not generated by a tagged ID), the software steps to flow point 509 which immediately steps the software back to flow point 504 (the top of this loop).

If in decision block 517 the ID of the CDR is found in the TIDL (the CDR was generated by a tagged ID), the software steps to decision block 518 where a check is made to determine whether the globally valid DCP filter should be applied to the CDR. If it is determined that the globally valid DCP filter should be applied to the CDR, the software steps to decision block 519 where the DCP of the CDR is compared to entries of the globally valid DCP list. If the DCP of the CDR is found in the globally valid DCP list, the software steps to flow point 520 which immediately steps the software back to flow point 504 (the top of this loop), thereby preventing the DCP of the CDR from being added to the PDL.

If in decision block 518 it is determined that the globally valid DCP filter should not be applied, or if in decision block 519 the DCP of the CDR is not found in the globally valid DCP list, the software steps to decision block 521 where a check is made to determine whether the commercial DCP filter should be applied to the CDR. If it is determined that the commercial DCP filter should be applied to the CDR, the software steps to decision block 522 where the DCP of the CDR is compared to entries of the commercial DCP list. If the DCP of the CDR is found in the commercial DCP list, the software steps to flow point 523 which immediately steps the software back to flow point 504 (the top of this loop), thereby preventing the DCP of the CDR from being added to the PDL.

If in decision block 521 it is determined that the commercial DCP filter should not be applied, or if in decision block 522 the DCP of the CDR is not found in the commercial DCP list, the software steps to decision block 524 where a check is made to determine whether the statistical rules filter should be applied to the CDR. If it is determined that the statistical rules filter should be applied to the CDR, the software steps to decision block 525 where the DCP of the CDR is evaluated by the rules contained in the statistical rules list. If the DCP of the CDR is eliminated by the rules contained in the statistical rules list, the software steps to flow point 526 which immediately steps the software back to flow point 604 (the top of this loop), thereby preventing the DCP of the CDR from being added to the PDL.

If in decision block 524 it is determined that the statistical rules filter should not be applied, or if in decision block 525 the DCP of the CDR is not eliminated by the rules contained in the statistical rules list, the software steps to decision block 527 where a check is made to determine whether the pattern rules filter should be applied to the CDR. If it is determined that the pattern rules filter should be applied to the CDR, the software steps to decision block 528 where the DCP of the CDR is evaluated by the rules contained in the pattern rules list. If the DCP of the CDR is eliminated by the rules contained in the pattern rules list, the software steps to flow point 529 which immediately steps the software back to flow point 504 (the top of this loop), thereby preventing the DCP of the CDR from being added to the PDL.

If in decision block 527 it is determined that the pattern rules filter should not be applied, or if in decision block 528 the DCP of the CDR is not eliminated by the rules contained in the pattern rules list, the software steps to stored data block 530 where the DCP of the CDR is added to the PDL. The new entry of the PDL is marked with the date and time of the CDR. Additionally, the DCP of the new PDL entry is linked to the tagged ID entry in the TIDL which matches the ID of the CDR.

In this manner, a DCP is added to the PDL as long as 1) the DCP is generated by a tagged ID, 2) the DCP has not been connected to a non-tagged ID within the past X time, and 3) the DCP survives the application of the optional additional filters.

Once a new DCP is added to the PDL in stored data block 530, the software steps to subroutine calling block 531. Subroutine calling block 531 calls the sub-process (shown in FIG. 9) which restores to the PDL any archived DCPs which are linked to the newly added DCP. Once the sub-process of FIG. 9 returns to subroutine calling block 531, the software steps to flow point 529 which immediately steps the software back to flow point 504 (the top of this loop), thereby completing the process of evaluating a stored CDR for inclusion in the PDL. This loop is repeated until each of the stored CDRs has been evaluated.

Once all of the CDRs have been evaluated, a PDL has been created and filtered which now contains only DCP entries to which only tagged IDs have been connected within the previous X amount of time. This PDL may now be transferred to an ADL which is used as a determinant for real-time blocking of connections in the network.

Now referring to FIG. 9, a sub-process for restoring archived DCP entries to the disallowed list based on these DCPs' links to a DCP which has been recently added to the disallowed list. The sub-process of FIG. 9 is called by subroutine calling block 531 of FIG. 5 as well as by subroutine calling block 632 of FIG. 6.

In FIG. 9 it is seen that the sub-process in entered through start of archived DCP restoral process 901. From here the software steps immediately to process block 902 where a DCP passed by the calling program is received. A pointer is placed at the top of the tagged ID list (TIDL) so that this list can be looped through from its first entry to its last entry. An empty archived DCP restore list (ADCPRL) is created which will be filled (by this sub-process) with DCPs which will be restored to the disallowed list based on links to the DCP received from the calling program.

From process block 902 the software steps to decision block 904 where it is determined whether the end of the TIDL has been reached. If the end of the TIDL has been reached, the software steps to process block 905 where the DCPs contained in the ADCPRL are compared to the entries in the globally valid DCP and commercial DCP lists. Any entries in the ADCPRL which are also found in either the globally valid DCP list or the commercial DCP list are removed from the ADCPRL. After the filtering performed in process block 905 is completed, the DCPs remaining in the ADCPRL are added to the disallowed list as shown in stored data block 906. From stored data block 906 the software steps to return to calling program block 907 which returns the software to the calling program.

If in decision block 904 it is determined that the end of the TIDL has not been reached, the software steps to data input block 908 where the next tagged ID entry of the TIDL is acquired. The software then steps to decision block 909 where it is determined whether any of the DCPs linked to this TIDL entry match the DCP received from the calling program. If none of the DCPs linked to this TIDL entry match the DCP received from the calling program, the software steps to flow point 910 which immediately steps the software back to flow point 903 (the top of this loop labeled R). If in decision block 909 it is determined that one of the DCPs linked to this TIDL entry matches the DCP received from the calling program, the software steps to process block 911 where all of the DCPs linked to the TIDL entry are added to the ADCPRL. From here the software steps to flow point 912 which immediately steps the software back to flow point 903 (the top of this loop). In this manner, this sub-process loops through each entry in the TIDL, adding DCPs to the ADCPRL which are linked to the DCP received from the calling program.

Now referring to FIG. 6, the start of real-time version main loop 601 steps immediately to flow point 603 (labeled E in FIG. 6) where the software calls the sub-process shown in FIG. 7a. Since the real-time version of the software is run continuously, the sub-process of FIG. 7a is called to re-establish a quantity of time to be stored in variable X each time the software of FIG. 6 runs through its main loop (processes an incoming CDR). Note that flow point 602 (labeled D in FIG. 6) is an entry point to the top of this main loop.

Referring now to the sub-process of FIG. 7a, the software enters at flow point 722 (labeled E in FIG. 7a) which steps immediately to process block 723 which loops through the stored NTDL entries to find the entry with the greatest time difference between the EA and LA fields for that DCP's entry. Once this entry has been located, the software steps to process block 724 where the value of variable X is made equal to the difference in time between the EA and LA fields of this stored NTDL entry. From here the software steps to flow point 725 (labeled F in FIG. 7a). From flow point 725 the software returns to the calling program of FIG. 6.

Referring now again to FIG. 6, the software returns to the calling program through flow point 604 (labeled F in FIG. 6) stepping immediately to data input block 605. In data input block 605 the software acquires a CDR for processing which has been received in real-time from the subscriber network. If no unprocessed CDR has been received from the subscriber network at this time, the software pauses, waiting to proceed as soon as a new unprocessed CDR has been received.

Once an unprocessed CDR is received, the software proceeds to decision block 606 where the TIDL is examined to determine whether the ID of the CDR is found in any of the TIDL entries.

Now a case will be described where the received CDR is generated by a non-tagged ID. If in decision block 606 the ID of the CDR is not found in a TIDL entry (the CDR was not generated by a tagged ID), the software steps to decision block 607 where it is determined whether the DCP of the CDR is found in the non-tagged destinations list (NTDL).

If it is determined that the DCP of the CDR is not found to already exist in the NTDL, the software steps to stored data block 608 where a new entry is added to the NTDL containing the DCP of the CDR. The non-tagged ID peg count for this entry is incremented (this peg count can be used later for statistical analysis of the entries in the NTDL). from here the software steps to process block 609 where the EA and LA field values for this NTDL entry are replaced with the date/time of the CDR. In this manner a single entry is kept in the NTDL for each DCP seen in a CDR generated by a non-tagged ID.

Once the process of process block 609 is completed or if in decision block 607 it is determined that the DCP of the CDR is found to already exist in the NTDL, the software steps to flow point 610 (labeled G in FIG. 6). From flow point 610 the software calls the sub-process shown in FIG. 7b which updates the EA and LA fields of the NTDL entry.

Now referring to FIG. 7b the software enters flow point 726 (labeled G in FIG. 7b) stepping immediately to decision block 727. In decision block 727 the date/time of the CDR is compared to the date/time of the EA field of the NTDL entry. If the date/time of the EA field of the NTDL entry is later (more recent) than the date/time of the CDR, the software steps to process block 728 where the value of the EA field of this NTDL entry is replaced with the date/time of the CDR after which the software steps to flow point 729 (labeled D in FIG. 7b) which returns the software to flow point 602 (labeled D in FIG. 6) which is an entry point to the top of the main loop of FIG. 6.

If in decision block 727 of FIG. 7b the date/time of the EA field of the NTDL entry is found to be earlier than the date/time of the CDR, the software steps to decision block 730. In decision block 730 the date/time of the CDR is compared to the date/time of the LA field of the NTDL entry. If the date/time of the LA field of the NTDL entry is earlier than the date/time of the CDR, the software steps to process block 732 where the value of the LA field of this NTDL entry is replaced with the date/time of the CDR after which the software steps to flow point 729 (labeled D in FIG. 7b) which returns the software to flow point 602 (labeled D in FIG. 6) which is an entry point to the top of the main loop of FIG. 6.

If in decision block 730 of FIG. 7b the date/time of the LA field of the NTDL entry is found to be later than the date/time of the CDR, the software steps to flow point 731 (labeled D in FIG. 7b) without making any changes to the EA or LA fields of the NTDL entry. Flow point 731 returns the software to flow point 602 (labeled D in FIG. 6) which is an entry point to the top of the main loop of FIG. 6. In this manner the software updates the EA or LA fields of the NTDL entry when a CDR is received which has a date/time that either precedes the date/time in the EA field or is more recent than the date/time in the LA field.

Referring once again to FIG. 6, a case will be described where the received CDR is generated by a tagged ID. If in decision block 606 the ID of the CDR is found in a TIDL entry (the CDR was generated by a tagged ID), the software steps to decision block 611 where it is determined whether the DCP of the CDR is found in the active disallowed list (ADL). If the DCP of the CDR is found to already exist in the ADL, the software steps to process block 612. In process block 612 the tagged ID peg count for this DCP's entry in the ADL is incremented. The most recent tagged ID attempt date/time field for this entry in the ADL is replaced with the date/time of the CDR. This DCP is then linked to the entry in the TIDL that matches the ID of the CDR. Once the processes of process block 612 are completed, the software steps to flow point 613 which immediately steps the software back to flow point 602 (the top of this loop).

If in decision block 611 the DCP of the CDR is not found to already exist in the ADL, the software proceeds to apply a series of filters to determine whether the DCP of the CDR should be added to the ADL. Starting the filtering process, the software steps from decision block 611 to decision block 614 where it is determined whether the DCP of the CDR exists in the NTDL. If the DCP of the CDR exists in the NTDL, the software steps to process block 615 where the tagged ID peg count for this DCP's entry in the NTDL is incremented. The most recent tagged ID attempt date/time field for this entry in the NTDL is replaced with the date/time of the CDR. The software then steps to process block 616. In process block 616, variable MRA is made equal to the date/time of the most recent recorded attempt by a non-tagged ID to connect to or from this DCP and the variable DTN is made equal to the current date and time. After this is done, the software steps to decision block 617 where the value of variable MRA is subtracted from the value of variable DTN. If this subtraction results in a value less than or equal to the value of variable X (indicating that a non-tagged ID connection to or from this DCP has been attempted more recently than the time now minus the value of X), the software steps to flow point 618 which immediately steps the software back to flow point 618 (the top of this loop), thereby not adding the DCP of the CDR to the ADL.

If the subtraction of decision block 617 results in a value greater than the value of variable X (indicating that no non-tagged ID connection to or from this DCP has been attempted more recently than the time now minus the value of X), or if in decision block 617 it is found that the DCP of the CDR is not found in the NTDL, the software steps to decision block 619.

In decision block 619 a check is made to determine whether the globally valid DCP filter should be applied to the CDR. If it is determined that the globally valid DCP filter should be applied to the CDR, the software steps to decision block 620 where the DCP of the CDR is compared to entries of the globally valid DCP list. If the DCP of the CDR is found in the globally valid DCP list, the software steps to flow point 620 which immediately steps the software back to flow point 602 (the top of this loop), thereby preventing the DCP of the CDR from being added to the ADL.

If in decision block 619 it is determined that the globally valid DCP filter should not be applied, or if in decision block 620 the DCP of the CDR is not found in the globally valid DCP list, the software steps to decision block 622 where a check is made to determine whether the commercial DCP filter should be applied to the CDR. If it is determined that the commercial DCP filter should be applied to the CDR, the software steps to decision block 623 where the DCP of the CDR is compared to entries of the commercial DCP list. If the DCP of the CDR is found in the commercial DCP list, the software steps to flow point 624 which immediately steps the software back to flow point 602 (the top of this loop), thereby preventing the DCP of the CDR from being added to the ADL.

If in decision block 622 it is determined that the commercial DCP filter should not be applied, or if in decision block 623 the DCP of the CDR is not found in the commercial DCP list, the software steps to decision block 625 where a check is made to determine whether the statistical rules filter should be applied to the CDR. If it is determined that the statistical rules filter should be applied to the CDR, the software steps to decision block 626 where the DCP of the CDR is evaluated by the rules contained in the statistical rules list. If the DCP of the CDR is eliminated by the rules contained in the statistical rules list, the software steps to flow point 627 which immediately steps the software back to flow point 602 (the top of this loop), thereby preventing the DCP of the CDR from being added to the ADL.

If in decision block 625 it is determined that the statistical rules filter should not be applied, or if in decision block 626 the DCP of the CDR is not eliminated by the rules contained in the statistical rules list, the software steps to decision block 628 where a check is made to determine whether the pattern rules filter should be applied to the CDR. If it is determined that the pattern rules filter should be applied to the CDR, the software steps to decision block 629 where the DCP of the CDR is evaluated by the rules contained in the pattern rules list. If the DCP of the CDR is eliminated by the rules contained in the pattern rules list, the software steps to flow point 630 which immediately steps the software back to flow point 602 (the top of this loop), thereby preventing the DCP of the CDR from being added to the ADL.

If in decision block 628 it is determined that the pattern rules filter should not be applied, or if in decision block 629 the DCP of the CDR is not eliminated by the rules contained in the pattern rules list, the software steps to stored data block 631 where the DCP of the CDR is added to the ADL. The new entry of the ADL is marked with the date and time of the CDR. Additionally, the DCP of the new ADL entry is linked to the tagged ID entry in the TIDL which matches the ID of the CDR.

In this manner, a DCP is added to the ADL as long as 1) the DCP is generated by a tagged ID, 2) the DCP has not been connected to a non-tagged ID within the past X time, and 3) the DCP survives the application of the optional additional filters.

Once a new DCP is added to the ADL in stored data block 631, the software steps to subroutine calling block 632. Subroutine calling block 632 calls the sub-process (shown in FIG. 9) which restores to the ADL any archived DCPs which are linked to the newly added DCP. Once the sub-process of FIG. 9 returns to subroutine calling block 632, the software steps to flow point 630 which immediately steps the software back to flow point 602 (the top of this loop), thereby completing the process of evaluating a received CDR for inclusion in the ADL. This loop is repeated continuously, evaluating each of the received CDRs.

As each new CDR is received, an ADL is updated with new DCP entries to which only tagged IDs have been connected within the previous X amount of time. Once a DCP entry is added to the ADL, it will not be removed until the DCP of the entry has not received any attempt to connect to it, and no attempt has been made to originate a connection from it, for X period of time. This ADL is used as a determinant for real-time blocking of connections in the network.

Now referring to FIG. 8, a process is described which archives dated entries of the disallowed list. This process is run periodically to remove disallowed list entries which have not been connected to within a period of time equal to the value of variable X. This process may be run against either the active disallowed list (ADL) used in both the real-time and non-real-time versions of the invention, or the pending disallowed list (PDL) used in a non-real-time version of the invention.

In FIG. 8 it can be seen that the archival process begins with start of disallowed DCP archival process 801 proceeding immediately to process block 802 where a pointer is set to the top record of the disallowed destinations list. This is done so that the software may loop through each of the entries in the disallowed destinations list from top to bottom. From here the software steps to decision block 804 where a check is made to determine whether the bottom of the disallowed destinations list has been reached. If it is determined that the end of the disallowed destinations list has been reached, the software steps to end of disallowed DCP archival process 805 thus terminating the archival process, having looped through all of the entries in the disallowed destinations list, archiving all entries in the list which have had no connection made to them within the previous X amount of time.

If in decision block 804 it is determined that the end of the disallowed destinations list has not been reached, the software steps to data input block 806 where the next entry's DCP is acquired. From here the software steps to process block 807 where variable MRA is made equal to the date/time of the most recent recorded attempt to connect to or from this DCP and the variable DTN is made equal to the current date and time. After this is done, the software steps to decision block 808 where the value of variable MRA is subtracted from the value of variable DTN. If this subtraction results in a value less than or equal to the value of variable X (indicating that a connection to or from this DCP has been attempted more recently than the time now minus the value of X), the software steps to flow point 809 which immediately steps the software back to flow point 803 (the top of this loop labeled H), thereby not archiving the entry in the disallowed destinations list. If the subtraction of decision block 808 results in a value greater than the value of variable X (indicating that no connection to or from this DCP has been attempted more recently than the time now minus the value of X), the software steps to stored data block 810 where the disallowed destinations list entry for this DCP is archived and the archived entry is marked with the current date and time. In this manner, any disallowed destinations list entries which have had no connection attempt activity recorded since the current time minus the value of X are archived off the list. From stored data block 810 the software steps to flow point 811 which immediately steps the software back to flow point 803 (the top of this loop), thereby looping through each of the entries in the in the disallowed destinations list, checking each for a match to the archival criterion.

It can therefore be seen that the software described herein controls the methods and processes which the apparatus of this invention uses to provide the functions, features, and advantages claimed herein. It will be clear to anyone reasonably skilled in this art that the software processes described in the simplified block diagrams of this specification can take certain alternate forms without substantively changing the functions, features, and advantages claimed herein. It will also be clear to anyone reasonably skilled in this art that apparatus of the invention described in this specification can take certain alternate forms without substantively changing the functions, features, and advantages claimed herein.

I claim:

1. In a communications network requiring a unique identifier for each network node, said communications network additionally requiring a first network node to specify said unique identifier of a second network node prior to allowing exchange of information between said first network node and said second network node, a network security system comprising: a network activity analyzer for for creating a disallowed network node identifiers list; said network activity analyzer in communication with a source of network activity connection records; said network activity connection records comprising at least said unique identifier of said first network node and said unique identifier of said second network node; said network activity analyzer accessing a list of unauthorized identifiers; each entry of said list of unauthorized identifiers comprising at least a said unique identifier of a network node known to exclusively perform unauthorized network activities; said network activity analyzer receiving said network activity connection records from said source of network activity connection records; for each received said network activity connection record, providing that said unique identifier of said first network node is contained in said list of unauthorized identifiers and also provided that said network activity analyzer determines that no attempt has been made within a predetermined amount of time to establish communication between said unique identifier of said second network node and a network node whose said unique identifier is not contained in said list of unauthorized identifiers, said network activity analyzer storing in said disallowed network node identifiers list an entry containing at least said unique identifier of said second network node.

* * * * *